US012288485B2

(12) United States Patent
Porterfield et al.

(10) Patent No.: US 12,288,485 B2
(45) Date of Patent: Apr. 29, 2025

(54) DISPLAY SYSTEM

(71) Applicant: BOX BROKERS, INC., Brea, CA (US)

(72) Inventors: James E. Porterfield, Aliso Viejo, CA (US); Larry Johnson, Colleyville, TX (US)

( * ) Notice: Subject to any disclaimer, the term of this patent is extended or adjusted under 35 U.S.C. 154(b) by 0 days.

(21) Appl. No.: 18/355,225

(22) Filed: Jul. 19, 2023

(65) Prior Publication Data

US 2024/0021109 A1 Jan. 18, 2024

Related U.S. Application Data

(63) Continuation-in-part of application No. 17/380,778, filed on Jul. 20, 2021, now Pat. No. 11,707,143.

(51) Int. Cl.
*A47F 3/06* (2006.01)
*G09F 5/00* (2006.01)

(52) U.S. Cl.
CPC ................ *G09F 5/00* (2013.01); *A47F 3/063* (2013.01)

(58) Field of Classification Search
CPC ........ A47F 3/063; A47F 5/0081; A47F 3/001; A47B 88/40; A47B 96/025; A47B 2096/209; A45C 11/16; A45C 5/065; A45C 13/002; A45C 13/06; A45C 5/00; G09F 5/00
USPC ................ 211/126.15; 190/16; 206/566, 6.1; 312/208.1, 334.27, 334.8
See application file for complete search history.

(56) References Cited

U.S. PATENT DOCUMENTS

| | | | | | |
|---|---|---|---|---|---|
| 653,493 | A | * | 7/1900 | Walpuski | B65D 5/5253 206/757 |
| 939,721 | A | * | 11/1909 | Lewis | A47F 7/03 229/120.32 |
| 2,047,097 | A | * | 7/1936 | Dunbar | A47F 3/06 211/169.1 |
| 2,295,697 | A | * | 9/1942 | Sulentic | A47B 88/49 312/334.8 |
| 2,314,943 | A | * | 3/1943 | Jensen | A47F 7/03 206/557 |
| 2,351,378 | A | * | 6/1944 | Weissman | A47F 7/03 206/45.29 |
| 2,353,522 | A | * | 7/1944 | Stern | A45C 11/16 206/758 |
| 2,639,793 | A | * | 5/1953 | Hellman | G09F 5/02 211/98 |
| 2,811,404 | A | * | 10/1957 | Brooks | A47F 3/063 312/270.3 |

(Continued)

*Primary Examiner* — Jennifer E. Novosad
(74) *Attorney, Agent, or Firm* — The Law Office of Austin Bonderer, PC; Austin Bonderer

(57) ABSTRACT

A display includes a riser and a cap where articles, such as jewelry elements and their holders, can be placed. The riser has a riser base and a riser side and the cap includes a cap side and a cap platform, wherein the cap side is in at least one of sliding and removable engagement with the riser side. In an alternative embodiment, the riser has a riser guide coupled with the riser side or the riser base, and the display further includes a drawer. The drawer has a drawer top, a drawer side, a drawer side guide coupled with the drawer side, and a drawer top guide. In yet another embodiment, the display further includes removable light fixtures having light emitting diodes.

7 Claims, 24 Drawing Sheets

(56) References Cited

U.S. PATENT DOCUMENTS

| | | | | | |
|---|---|---|---|---|---|
| 2,888,136 | A * | 5/1959 | Robert | D05B 91/12 | 206/751 |
| 3,003,839 | A * | 10/1961 | Bloom | A47B 87/0284 | 312/111 |
| 3,086,645 | A * | 4/1963 | Yount | G09F 5/02 | 206/751 |
| 3,406,821 | A * | 10/1968 | Weissberg | A45C 11/16 | 220/315 |
| 3,554,625 | A * | 1/1971 | Sly, Sr. | A47F 7/03 | 312/126 |
| 3,806,220 | A * | 4/1974 | Payne | A47B 27/00 | 211/126.15 |
| 4,216,858 | A * | 8/1980 | Beauchamp | A47F 7/03 | 220/8 |
| 4,269,461 | A * | 5/1981 | Roach, Jr. | B65D 85/42 | 312/111 |
| 4,281,527 | A * | 8/1981 | Leopoldi | A45C 11/328 | 70/456 R |
| 4,746,009 | A * | 5/1988 | Liberman | G09F 5/02 | 206/707 |
| 4,875,688 | A * | 10/1989 | Whaley | A63F 3/00895 | 273/287 |
| 4,958,889 | A * | 9/1990 | Boyle | G06F 1/1632 | 248/455 |
| 4,998,637 | A * | 3/1991 | Marovskis | B65D 1/225 | 220/6 |
| 5,104,080 | A * | 4/1992 | Berger | A47J 37/0786 | 211/90.01 |
| 5,213,401 | A * | 5/1993 | Hatcher | A47B 21/0314 | 361/679.08 |
| 5,344,033 | A * | 9/1994 | Herman | A47F 5/12 | 108/6 |
| 5,388,691 | A * | 2/1995 | White | H01H 9/0242 | 340/12.55 |
| D372,580 | S * | 8/1996 | Chipman, Sr. | D3/262 | |
| 5,603,558 | A * | 2/1997 | Zimmer | A47B 81/00 | 312/351 |
| 5,678,204 | A * | 10/1997 | Naylor | H04B 1/03 | 455/575.8 |
| 5,788,346 | A * | 8/1998 | Jacobson | A47B 21/0314 | 312/334.44 |
| 6,006,899 | A * | 12/1999 | McAuley | G09F 3/04 | 206/6.1 |
| 6,036,288 | A * | 3/2000 | Shih | A47B 21/0314 | 312/334.8 |
| 6,158,829 | A * | 12/2000 | Nielsen | A47B 81/062 | 312/208.1 |
| 6,182,830 | B1 * | 2/2001 | Au | B65D 43/20 | 206/6.1 |
| 6,206,495 | B1 * | 3/2001 | Peterson | A47B 46/00 | 312/283 |
| 6,364,136 | B1 * | 4/2002 | Weshler | A47F 5/103 | 211/175 |
| 6,394,567 | B1 * | 5/2002 | Welch | A47B 88/43 | 312/334.41 |
| 6,612,665 | B2 * | 9/2003 | Nielsen | A47B 81/06 | 312/208.1 |
| 6,681,953 | B2 * | 1/2004 | Au | A45C 11/10 | 220/815 |
| 7,063,219 | B2 * | 6/2006 | Fann | A47B 96/025 | 211/74 |
| 7,828,253 | B2 * | 11/2010 | Meyer | A47B 21/00 | 108/50.01 |
| 8,371,856 | B2 * | 2/2013 | Shen | G09B 29/003 | 434/128 |
| 9,079,702 | B2 * | 7/2015 | Lahmann | B65D 51/249 | |
| 9,367,984 | B2 * | 6/2016 | Daugbjerg | E05B 65/46 | |
| 9,924,605 | B2 * | 3/2018 | Leyden | G07G 1/0018 | |
| 10,477,991 | B1 * | 11/2019 | Fragala | A47F 7/02 | |
| 11,278,094 | B1 * | 3/2022 | Griffin | A45C 13/002 | |
| 11,707,143 | B2 * | 7/2023 | Porterfield | A47F 7/03 | 312/122 |
| 2005/0269216 | A1 * | 12/2005 | Ovadia | A45C 11/16 | 206/6.1 |
| 2009/0008349 | A1 * | 1/2009 | Kim | F16M 11/10 | 211/150 |
| 2009/0071867 | A1 * | 3/2009 | Au | A45D 40/24 | 220/520 |
| 2014/0354001 | A1 * | 12/2014 | Hanley | A47B 57/10 | 296/24.44 |
| 2015/0289618 | A1 * | 10/2015 | Westphal | A45C 11/16 | 206/38 |
| 2016/0095683 | A1 * | 4/2016 | Lo | A61C 19/10 | 206/83 |
| 2016/0345726 | A1 * | 12/2016 | Chou | A47B 47/0091 | |
| 2020/0179092 | A1 * | 6/2020 | Eisenberger | A61C 7/08 | |
| 2023/0157463 | A1 * | 5/2023 | Gady | A47F 5/10 | 211/13.1 |
| 2024/0021109 | A1 * | 1/2024 | Porterfield | A47F 7/03 | |

* cited by examiner

DISPLAY SYSTEM

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to a display and method of displaying an article via the display. The display includes a riser and a cap where, for instance, jewelry elements and their holders can be placed. In an alternative embodiment, the display further includes a drawer. In a further embodiment, the display further includes removable light fixtures having light emitting diodes. The display further provides a storage space for storing articles related to the display. Although the display of the present invention is described as a jewelry display, the system can readily be used to display any other article.

BACKGROUND

Conventional jewelry displays are bulky and take up valuable space in the vault. The displays come in different sizes and configurations. There are single piece displays and trays to hold a dozen or more pieces. There are larger pieces to hold a necklace, and ramps to hold 20-30 chains. Every morning, a jeweler with a safe/vault retrieves the jewelry from the safe/vault and individually places them into a conventional jewelry box or onto a conventional display. Then every evening the jeweler must collect the jewelry from the boxes, or display elements, and return the jewelry to the safe/vault. Jewelers with larger vaults collect the display elements or boxes every evening, place them in plastic tubs, then place the plastic tubs into the vault, this way avoiding the need to take the jewelry off each individual display or out of each box. In the morning, the jeweler then retrieves the plastic tubs and individually places the displays elements or boxes back into the showcase. This process is time consuming. Therefore, there is a need for a jewelry display that provides a platform that can hold jewelry and can be readily removed along with the jewelry to be placed in the vault.

SUMMARY

The display elements used with the present invention all have magnets in their bases. They adhere to the cap platforms, which decreases the chance of display elements falling off the cap platforms when being put in or retrieved from the safe/vault. The cap platforms, being a thin sheet of wood (½" or thinner), take up minimal safe/vault space, allow a jeweler to transport ⅓$^{rd}$ of a showcase at a time safely with the magnetized displays adhered to the platform caps. In some embodiments, the cap platforms can be made of other suitable materials, including, for example, plastic, aluminum, steel or a combination thereof.

Two main issues which concern a typical jeweler are addressed. The present invention makes it much easier and quicker to open and close the store. All jewelry needs to be carried to and from their safe or vault each morning and each evening. The display of the present invention has risers with removable caps that have all the elements magnified to them, make this task much easier and quicker. They open a showcase, remove 3 top caps, and they're done. Working with conventional displays, a jeweler would have to open their showcase, then take each element out of the case, put it in a plastic tub, stacking them on top of each other often leading to damage, then carry the plastic tub to the vault or safe. Then in the morning, the jeweler would have to take the plastic tub out of the safe, back to the case, and reset each piece up one by one by one. With the present invention, they only carry the caps back from the vault and their displays are set up the exact way they were the day before.

The other issue of concern is privacy and back strain. Having to reach far into the conventional display system in order to retract a piece of jewelry can expose the private parts of a female sales clerk to the public. Furthermore, such motions are also associated with excessive bending which cause back pain, especially for the older individuals. Moreover, these individuals perform these motions a number of times everyday which makes the task unbearable. The display of the present invention, as will be described fully below, include caps that slide in and out of their associated risers or drawers.

Historically, low-end jewelers put their jewelry into hinged jewelry boxes, and put those inside the showcase. However, most medium-to-high-end jewelers use jewelry holders (that are separate and different than the jewelry box). A jewelry holder may be a ring tray that holds 1-24 rings, a neck form that holds 1 necklace, a chain ramp that holds 20-25 necklaces, and an earring stand for 1 pair or 12 pairs of earrings. These holders are magnetized at the bottom so as to stick to the sheet metal in cap platform.

The display of the present invention, as described herein, will be placed inside a showcase to make it easy to reach goods in the front (by the sliding drawer and/or the cap), and to make it easy for jewelers, coin dealers, or any other business that has valuable goods in their showcase set up and close down each night.

The present invention comprises a riser and a cap. The riser comprises a planar base and a side along a portion of the perimeter of the base. The cap includes a platform and a side along a portion of the perimeter of the platform. This configuration allows the cap to be easily placed on the riser, slid in and out of the riser, and removed from the riser. In one configuration, the cap is made from a composite material, for instance, a layer of wood and a layer of metal on top of the wood layer. As such, jewelry holders with magnets can be magnetically coupled with the cap.

In an alternative embodiment of the present invention, the display further includes a drawer. In this configuration, the riser includes guides which are coupled with either the side or the base of the riser. The drawer has a planar top and a side along a portion of the perimeter of the top. The drawer further includes guides that are coupled with the side and engage the riser guides to readily slide in and out of the riser. The drawer top further includes one or more strips that are used to securely position the cap onto the drawer top. In some embodiments, the platform cap could be affixed to the drawer top using a series of male/female (opposite polarized) magnets, as shown, for example, in FIGS. 14A through 17C.

In one aspect, a display is disclosed, wherein the display comprises a riser comprising a riser base having a substantially planar surface, a riser side extending upwardly from at least a portion of a perimeter of the riser base, and a riser guide coupled with at least one of the riser base and the riser side, a drawer comprising a drawer top having a substantially planar surface, a drawer side extending downwardly from at least a portion of a perimeter of the drawer top, a drawer side guide coupled with the drawer side, wherein the drawer side guide is in sliding engagement with the riser guide, and a drawer top guide coupled with the drawer top, and a cap comprising a cap platform having a substantially planar surface, and at least one of a groove in the cap platform and a cap platform guide coupled with the cap platform, wherein the at least one of a groove in the cap platform and a cap platform guide coupled with the cap platform is in at least one of sliding and removable engagement with the drawer top guide.

Preferably, the riser base is rectangular.

Preferably, the riser side comprises three beams having rectangular cross sections.

Preferably, the riser guide comprises two guide rails coupled with two of the three beams along an axial direction of the riser base.

Preferably, the riser guide comprises two guide rails coupled with the riser base along an axial direction of the riser base.

Preferably, a height of the three beams is greater than zero, thereby, the display providing a storage space between the drawer and the riser.

Preferably, the drawer top is rectangular.

Preferably, the drawer side comprises two beams having rectangular cross sections.

Preferably, the drawer side guide comprises two guide rails coupled with the two beams along an axial direction of the drawer top.

Preferably, the drawer top guide comprises two strips coupled with the drawer top along an axial direction of the drawer top.

Preferably, the drawer further comprises a support beam coupled with the drawer top along a transverse direction of the drawer top.

Preferably, the drawer further comprises a handle coupled with the drawer top.

Preferably, the cap platform is rectangular.

Preferably, the cap platform comprises two grooves along an axial direction of the cap platform.

Preferably, the cap further comprises one or more magnet coupled with the cap platform along a transverse direction of the cap platform.

Preferably, the riser base, the riser side, the drawer top, the drawer side, and the cap platform are made from wood.

Preferably, the drawer top comprises a composite material made from aluminum and sheet metal, and/or a plastic material.

Preferably, the cap platform comprises a composite material made from aluminum and sheet metal, and/or a plastic material.

Preferably, the display further comprises a lighting system coupled with the riser.

Preferably, the lighting system comprises two modular light fixtures, and wherein each of the two modular light fixtures comprises a plurality of light emitting diodes.

In another aspect, a display is disclosed, wherein the display comprises a riser comprising a riser base having a substantially planar surface, and a riser side extending upwardly from at least a portion of a perimeter of the riser base, and a cap comprising a cap platform having a substantially planar surface and a cap side extending downwardly from at least a portion of a perimeter of the cap platform, wherein the cap side is in at least one of sliding and removable engagement with the riser side.

Preferably, the riser base is rectangular.

Preferably, the riser side comprises three beams having rectangular cross sections.

Preferably, the cap platform is rectangular.

Preferably, the cap side comprises three L-shaped beams, and wherein two of the three L-shaped beams are coupled with the cap platform along an axial direction of the cap platform and the third L-shaped beam is coupled with the cap platform along a transverse direction of the cap platform.

Preferably, the cap further comprises a support beam coupled with the cap platform along a transverse direction of the cap platform.

Preferably, the riser base, the riser side, and the cap platform are made from wood, aluminum, plastic, sheet metal, or the like.

Preferably, the cap platform comprises a composite material made from aluminum and sheet metal, and/or a plastic material, and/or a wood material.

In another aspect, a method of displaying an article via a display is disclosed, wherein the display comprises a riser comprising a riser base having a substantially planar surface, a riser side extending upwardly from at least a portion of a perimeter of the riser base, and a riser guide coupled with at least one of the riser base and the riser side, a drawer comprising a drawer top having a substantially planar surface, a drawer side extending downwardly from at least a portion of a perimeter of the drawer top, a drawer side guide coupled with the drawer side, wherein the drawer side guide is in sliding engagement with the riser guide, and a drawer top guide coupled with the drawer top, and a cap comprising a cap platform having a substantially planar surface and at least one of a groove in the cap platform and a cap platform guide coupled with the cap platform, wherein the at least one of a groove in the cap platform and a cap platform guide coupled with the cap platform is in at least one of sliding and removable engagement with the drawer top guide. In some embodiments, the groove and cap platform guide could be replaced by a series of opposite polarized magnets, as described here within. The method further comprising at least one of placing the cap on the drawer, and sliding the drawer, and removing the cap from the drawer.

In another aspect, a method of displaying an article via a display is disclosed, wherein the display comprises a riser comprising a riser base having a substantially planar surface and a riser side extending upwardly from at least a portion of a perimeter of the riser base, and a cap comprising a cap platform having a substantially planar surface and a cap side extending downwardly from at least a portion of a perimeter of the cap platform, wherein the cap side is in at least one of sliding and removable engagement with the riser side, the method comprising at least one of placing the cap on the riser, sliding the cap, and removing the cap from the riser.

DESCRIPTION OF THE DRAWINGS

FIG. 4B shows a top perspective view of the drawer of FIG. 4A. The drawer top includes a drawer top guide which comprises of two strips that are positioned symmetrically on each side of the axial axis of the drawer top and coupled with the drawer top. A cap, such as the one shown in FIG. 3, has two grooves in the cap platform which are in sliding and/or removable engagement with the drawer top guide. The drawer top can be made from a composite material consisting of a thick layer of wood and a thin layer of metal which is glued to the top of the wood. Other materials may be used, including plastic, aluminum, or the like.

FIG. 8B shows a bottom perspective view of the cap of FIG. 8A. The cap includes a cap side which comprises of three L-shaped beams, wherein two of them are coupled with the cap platform along an axial direction of the cap platform and the third L-shaped beam is coupled with the cap platform along a transverse direction of the cap platform. The cap further includes a support beam along a transverse direction of the cap platform. The support beam resists bending of the cap platform around its axial direction. The L-shaped beams may be formed in other shapes, such as in a thin rectangular shape, a square shape, or the like.

DETAILED DESCRIPTION OF THE PRESENTLY PREFERRED EMBODIMENTS

Figure 1:
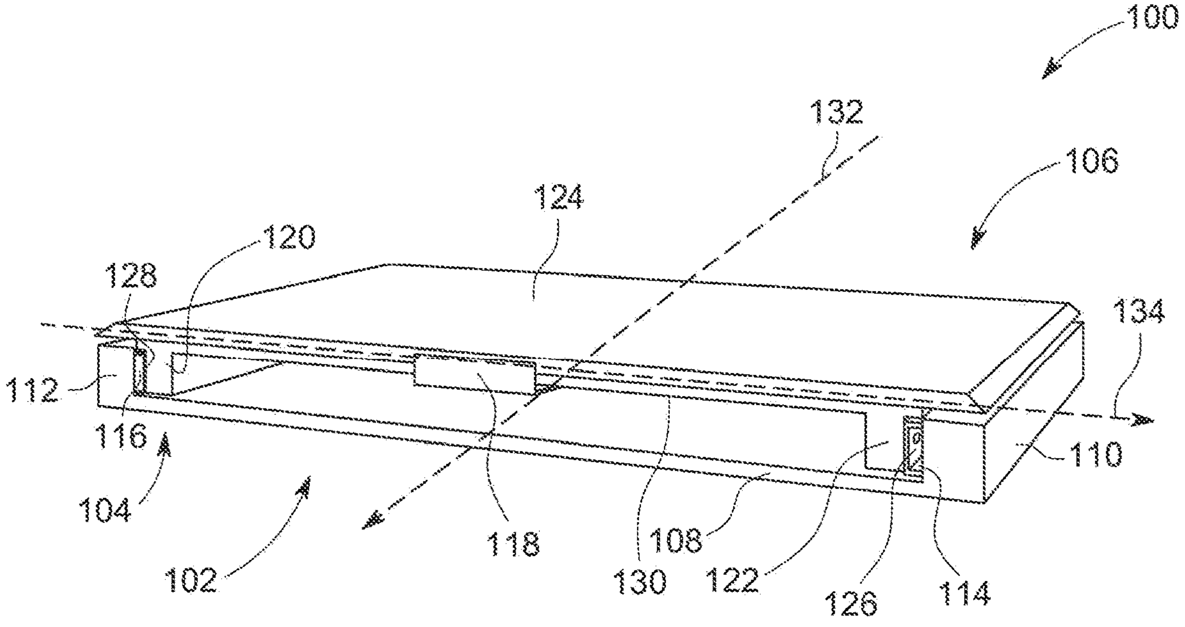
FIG. 1 shows a perspective view of a display according to a preferred embodiment. The display includes a riser having a rectangular riser base, a riser side that comprises of three beams around a perimeter of the riser base, and two riser guides that are coupled with the riser side along an axial direction of the riser base. The display further comprises a drawer that has a rectangular top and a side that comprises of two beams around a perimeter of the drawer top, and two drawer side guides that are coupled with the drawer side along an axial direction of the drawer top. The display, further includes a cap that has a cap platform, one or more grooves in the cap platform, and/or cap platform guide that is coupled with the cap platform. In some embodiments, the groove and cap platform guide could be replaced by a series of opposite polarized magnets, as described here within.

FIG. 1 depicts a perspective view of a display 100 according to a preferred embodiment. The display 100 includes a riser 102 having a rectangular riser base 108, a riser side that comprises of three beams, only two of which 110 and 112 are visible, around a perimeter of the riser base 108. The riser 102 further includes two riser guides 114 and 116 which are coupled with the riser side, i.e., beam 110 and beam 112, along an axial direction 132 of the riser base 108. The display 100 further comprises a drawer 104 that has a rectangular top 130 and a side that comprises of two beams 120 and 122 around a perimeter of the drawer top 130, and two drawer side guides 126 and 128 that are coupled with the drawer side, i.e., beam 120 and 122, along an axial direction of the drawer top 130, which in this embodiment is the same direction as the axial direction 132 of the riser base 108.

The drawer side guides 126 and 128 are in sliding engagement with the two riser guides 114 and 116. Specifically, the drawer 104 can slide in both directions along the axial direction of drawer top 130. In one preferred embodiment, the drawer side guides 126 and/or 128 may comprise stops to prevent the drawer 104 from being slid completely out of the riser 102.

The drawer 104 further includes a drawer top guide (not visible in this figure, but see FIG. 3) which is coupled with the drawer top 130. The drawer 104 can further include a support beam (not visible in this figure, but see FIG. 4A) coupled with the drawer top 130 along a transverse direction 134 of the drawer top 130. The support beam operates to provide resistance to any undesired bending of the drawer top 130. In some embodiments, the support beam is not necessary, especially when the platform cap is formed from, for example, aluminum and sheet metal materials or plastic.

The display 100, further includes a cap 106 that has a cap platform 124 and two grooves (not visible in this figure, but see FIG. 5A) in the cap platform 124. In an alternative embodiment, the cap 106 comprises a cap platform guide that is coupled with the cap platform 124. The grooves and/or the cap platform guide is in sliding and/or removable engagement with the drawer top guide. Specifically, the cap 106 can slide in both direction along an axial direction of the cap platform 124, which in this embodiment is the same direction as the axial direction 132 of the riser base 108. The cap 106 can also be freely removed from the drawer 104, i.e., lifted from or placed on the drawer top 130. The drawer 104 further includes a handle 118 for use in sliding the drawer 104 and the cap 106 in the axial direction 132. The display 100 has generally a rectangular shape in this preferred embodiment. Specifically, the riser base 108, the drawer top 130, and the cap platform 124 are substantially planar and rectangular. However, other geometric shapes, such as a combination of rectangles, squares, circles, ellipses, etc., are contemplated.

The riser 102 has a side which extends upwardly from at least a portion of the perimeter of the riser base 108. The riser side is made up of three separate beams, only two of which 110 and 112 are visible. All three beams have a rectangular cross section, although other cross sections such as square, circular, triangular, elliptical, etc., are contemplated. In another embodiment, the riser side is a single piece structure and is coupled with the riser base 108 along three sides of the riser base 108. The fourth side of the riser base 108 is not coupled with any structure and is left open. The height of the three beams is greater than zero, thereby, providing the display 100 a storage space between the riser 102 and the drawer 104 to store articles related to the display. See, especially, the base riser of the embodiments of FIG. 7 and FIGS. 17A through 19D, for example, which provides a significant storage space, as discussed in greater detail below.

In this preferred embodiment, the riser side is coupled with the riser base 108 via one or more fasteners, such as bolts, screws, and/or nails. In another embodiment, the riser side may be coupled with the riser base 108 via an adhesive. The riser base 108 and its side can be made from a single material or a composite material. For example, the riser base 108 and the sides can be integrally formed, such as via injection molded plastic. In some embodiments, the riser base 108 and its side, i.e., the three separate beams, only two of which 110 and 112 are visible, are made from wood.

The riser guides 114 and 116 are coupled with the riser side, i.e., beam 110 and beam 112, along the axial direction 132 of the riser base 108. In a preferred embodiment, the riser guides 114 and 116 are guide rails made from aluminum or steel. In another embodiment, the riser guides 114 and 116 are coupled with the riser base 108 (see FIG. 2). Furthermore, in this preferred embodiment, the lengths of the three beams of the riser side cover the entire three sides of the rectangular riser base 108. In another embodiment, each of the three beams cover only a portion of the perimeter of the riser base 108, i.e., each of the three beams cover only a partial length of the corresponding side of the riser base 108.

The drawer 104 has a side which extends downwardly from at least a portion of the perimeter of the drawer top 130. The drawer side is made up of two separate beams 120 and 122 which have a rectangular cross section, although other cross sections such as square, circular, triangular, elliptical, etc., are contemplated. The third and fourth side of the drawer top 130 are not coupled with any structure and are left open.

In this preferred embodiment, the drawer side is coupled with the drawer top 130 via one or more fasteners, such as bolts, screws, and/or nails. In another embodiment, the drawer side may be coupled with the drawer top 130 via an adhesive. The drawer top 130 and its side can be made from a single material or a composite material. In this preferred embodiment, the drawer top 130 is made from a composite material, namely a thick layer of wood on the bottom and a thin layer of sheet metal on the top. The sheet metal layer of the drawer top 130 will be used to magnetically secure the cap 106, via two or more magnets in the cap platform 124 (see FIG. 5A), to the drawer top 130. In some embodiments, drawer side can be integrally formed with the drawer top. For example, the drawer base and the drawer top may be formed as a single piece via an injection molded plastic.

The drawer side guides 126 and 128 are coupled with the drawer side, i.e., beam 120 and 122, along an axial direction of the drawer top 130, which in this embodiment is the same direction as the axial direction 132 of the riser base 108. In a preferred embodiment, the drawer side guides 126 and 128 are guide rails made from aluminum or steel. The drawer side guides 126 and 128 are in sliding engagement with the riser guides 114 and 116.

In this embodiment, the drawer side guides 126 and 128 are coupled to the sides of the two beams 120 and 122. In an alternative embodiment, drawer side guides 408 and 410 are coupled with the bottoms of the two beams 404 and 406 (see FIG. 4A) which engage the two riser guides 214 and 216 that are coupled with the riser base 208 (see FIG. 2).

The drawer 104 further includes a drawer top guide (not visible in this figure, but see FIG. 3) which is coupled with the drawer top 130. In this embodiment, the drawer top guide comprises two strips coupled with the drawer top 130 along the axial direction of the drawer top 130. The two strips may be made from, wood, plastic or metallic material, such as aluminum, for example. The drawer 104 may alternatively include a support beam, discussed below, to resist any undesirable bending of the drawer top 130.

Moreover, the lengths of the two beams of the drawer side cover the entire two sides of the rectangular drawer top 130. In another embodiment, each of the two beams cover only a portion of the perimeter of the drawer top 130, i.e., each of the two beams cover only a partial length of the corresponding side of the drawer top 130.

The cap 106 comprises the cap platform 124 and two grooves (not visible in this figure, but see FIG. 5A) that are cut into the cap platform 124. In an alternative embodiment, the cap 106 incorporates a cap platform guide that is coupled with the cap platform 124. The grooves and/or the cap platform guide is in sliding and/or removable engagement with the drawer top guide. In a preferred embodiment, the drawer top guide, namely the two strips, and the grooves are generally rectangular and their corresponding dimensions are such that the grooves make either a clearance fit or an interference fit with the drawer top guide.

The cap platform 124 can be made from a single material, such as wood, aluminum, metal, plastic, or the like, or a composite material. In this preferred embodiment, cap platform 124 is made from a composite material, namely a thick layer of wood on the bottom and a thin layer of sheet metal on the top. In some embodiments, the cap platform 124 can be formed from a plastic material, such as an injection molded plastic. In this embodiment, when the cap platform 124 is formed from an injection molded plastic, the grooves and/or cap platform guides can be made integrally, during the injection molding of the cap platform 124. The sheet metal layer of the cap platform 124 will be used to magnetically secure items, such as jewelry holders that include magnets.

Figure 2:
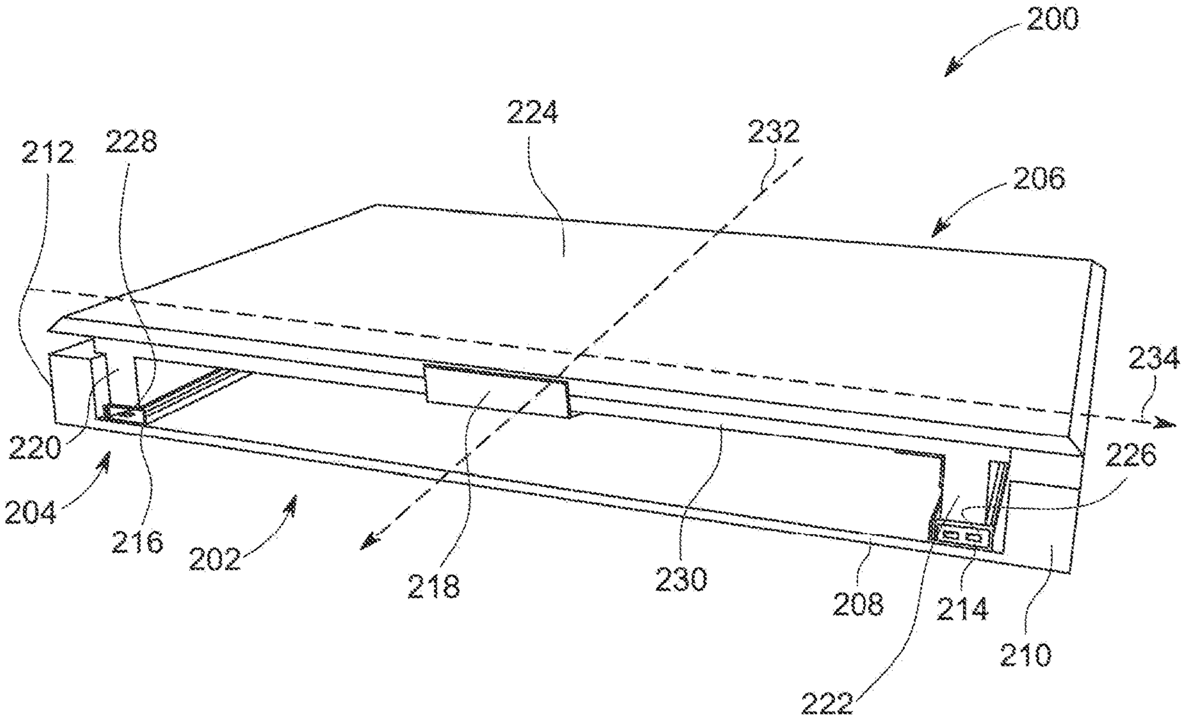
FIG. 2 shows a perspective view of a display according to a preferred embodiment. In this embodiment, the riser guide includes two guide rails which are coupled with the riser base.

FIG. 2 depicts a perspective view of a display 200 according to a preferred embodiment. The only difference between the display 200 and the display 100 is that the riser guide is coupled with the riser base and the drawer side guide is coupled with the bottom side of the drawer side. Specifically, the display 200 includes a riser 202, a drawer 204, and a cap 206. The riser 200 comprises a rectangular riser base 208, a riser side that comprises of three beams disposed around a perimeter of the riser base 208. Only two of the three beams, namely beam 210 and beam 212 are visible. The riser 202 further includes two riser guides 214 and 216 which are coupled with the riser base 208 along an axial direction 232 of the riser base 208.

The drawer 204 has a rectangular top 230 and a side that comprises of two beams 220 and 222 around a perimeter of the drawer top 230, and two drawer side guides 226 and 228 that are coupled with the drawer side, i.e., beam 220 and 222, along an axial direction of the drawer top 230, which in this embodiment is the same direction as the axial direction 232 of the riser base 208. The drawer side guides 226 and 228 are coupled with the bottom side of the beams 220 and 222. The drawer side guides 226 and 228 are in sliding engagement with the riser guides 214 and 216. The drawer 204 further includes a drawer top guide (not visible in this figure, but see FIG. 3) which is coupled with the drawer top 230. The drawer 204 further includes a support beam (not visible in this figure, but see FIG. 4A) coupled with the drawer top 230 along a transverse direction 234 of the drawer top 230. The support beam operates to provide resistance to any undesired bending of the drawer top 230. In some embodiments, the support beam is not necessary, especially when the platform cap is formed from, for example, plastic, aluminum and sheet metal materials.

The cap 206 has a cap platform 224 and two grooves (not visible in this figure, but see FIG. 5A) in the cap platform 224. In an alternative embodiment, the cap 206 comprises a cap platform guide that is coupled with the cap platform 224. The grooves and/or the cap platform guide is in sliding and/or removable engagement with the drawer top guide. The drawer 204 further includes a handle 218 for use in sliding the drawer 204 and the cap 206 in the axial direction 232.

Figure 3:
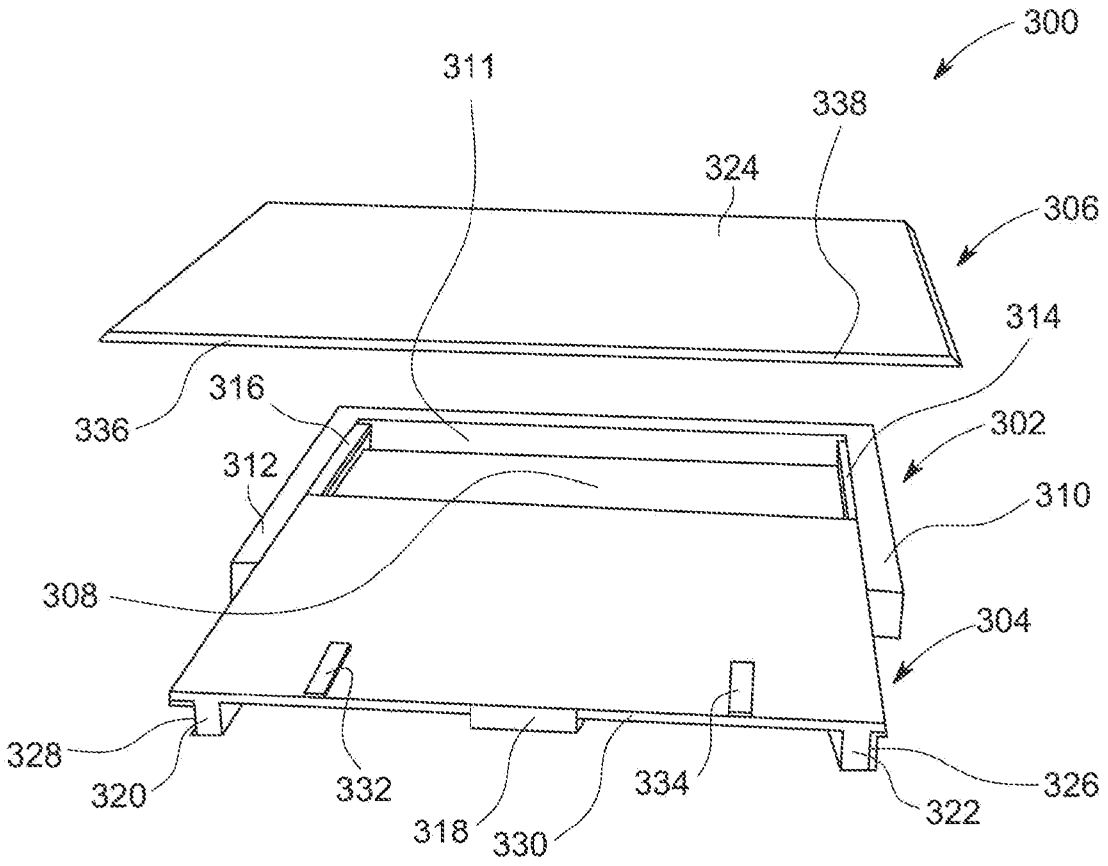
FIG. 3 shows an exploded view of the display of FIG. 1. The drawer has a drawer top guide, coupled with the drawer top, which comprises of two strips along an axial direction of the drawer top. The drawer side guide is in sliding engagement with the riser guide. The cap includes two grooves in the cap platform which are in sliding and/or removable engagement with the drawer top guide.

FIG. 3 shows an exploded view of a display 300, similar to the display 100 of FIG. 1. The display 300 comprises a riser 302, a drawer 304, and a cap 306. The riser 302 comprises a riser base 308 that is rectangular and has a substantially planar surface. The riser 302 comprises a riser side, extending upwardly from riser base 308, which comprises three beams of rectangular cross section 310, 311, and 312. The riser 302 comprises a riser guide which comprises a guide rail 314, coupled with the beam 310, and a guide rail 316, coupled with the beam 312.

The drawer 304 comprises a drawer top 330 which is rectangular and has a substantially planar surface. The drawer 304 further comprises a drawer side which extends downwardly from the drawer top 330. The drawer side comprises two beams 320 and 322 of rectangular cross section. The drawer 304 further comprises a drawer side guide which comprises a guide rail 326, coupled to the side of the beam 322, and a guide rail 328, coupled to with the side of the beam 320. The drawer guide rails 326 and 328 are in sliding engagement with the riser guide rails 314 and 316, respectively. The drawer 304 further comprises a drawer top guide which comprises two strips 332 and 334, such as plastic, metal, wood or composite strips, which are coupled with drawer top 330. In some embodiments, such as when the entire drawer and sides are injection molded, the drawer top guides (strips 332, 334) can be molded as a single piece with the drawer top and sides.

The cap 306 comprises a rectangular cap platform 324 which has a substantially planar surface. The cap 306 further comprises two grooves 336 and 338 (see also FIG. 5A) which are cut into the cap platform 324 and are in sliding and/or removable engagement with the drawer top guide, i.e., the strips 332 and 334.

Figure 4A:
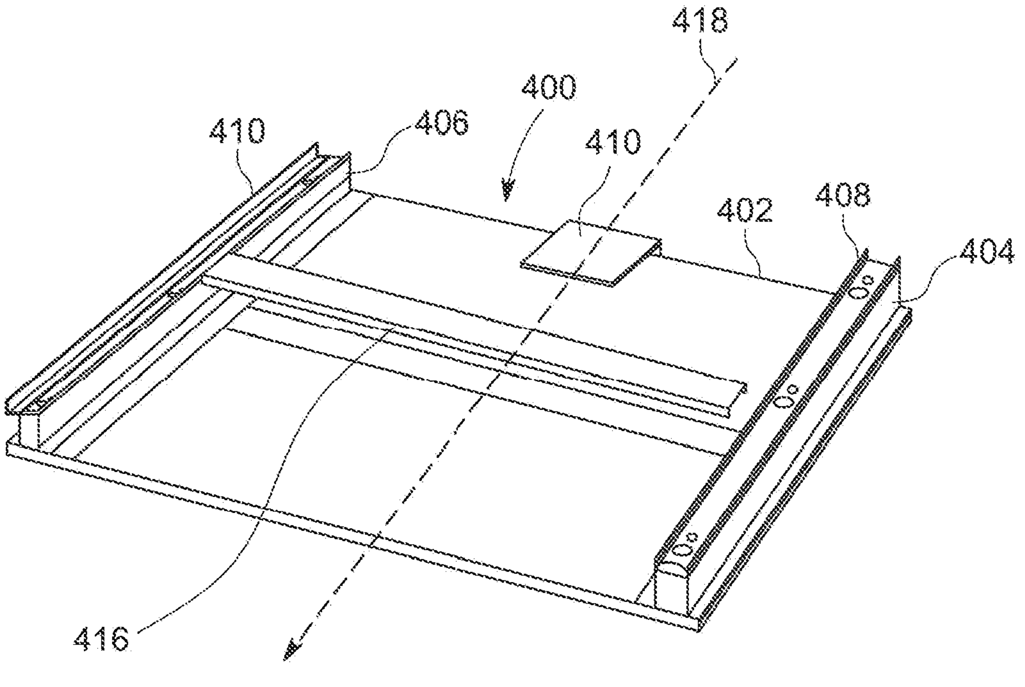
FIG. 4A shows a bottom perspective view of a drawer according to a preferred embodiment. According to this embodiment, the drawer side guides are coupled with the bottom of two beams which engage a riser guide which includes two guide rails that are coupled with the riser base, such the display shown in FIG. 2. The drawer further includes a support beam along a transverse direction of the drawer top. The support beam resists bending of the drawer top around its axial direction.

FIG. 4A depicts a bottom perspective view of a drawer 400, similar to the drawer 204, of FIG. 2. The drawer 400 has a rectangular drawer top 402 having a substantially planar surface. The drawer 400 further comprises a drawer side which includes a beam 404 and a beam 406 of rectangular cross sections. The drawer 400 further includes a drawer side guide which comprises a guide rail 408, coupled with the bottom side of the beam 404, and a guide rail 410, coupled with the bottom side of the beam 406. The drawer 400 further includes a support beam 416 which resists any undesirable bending of the drawer top 402. The drawer 400 further includes a handle 410.

Figure 4B:
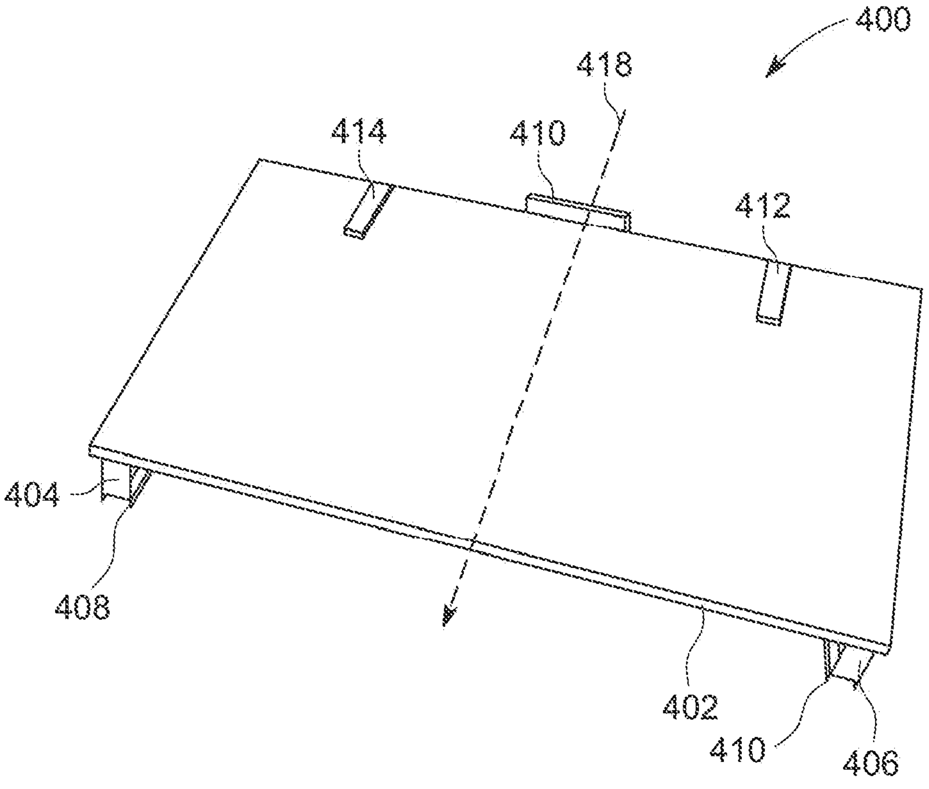

FIG. 4B shows a top perspective view of the drawer 400 of FIG. 4A. The drawer top 402 includes a drawer top guide which, in this embodiment, comprises two strips 412 and 414 that are positioned symmetrically on each side of an axial axis 418 of the drawer top 402 and coupled with the drawer top 402. A cap, such as the cap 306 shown in FIG. 3, has two grooves 336 and 338 in the cap platform 324 which are in sliding and/or removable engagement with the drawer top guide 412 and 414, via a clearance fit or an interference fit. The drawer top 402 is made from a composite material consisting of a thick layer of wood and a thin layer of sheet metal which is glued to the top of the wood. A cap, such as the cap 306 of FIG. 3, may comprise one or more magnets embedded within the cap platform 324 (see, FIG. 5A, magnets 508 and 510) to magnetically couple the cap 306 to the drawer 400.

Figure 5A:
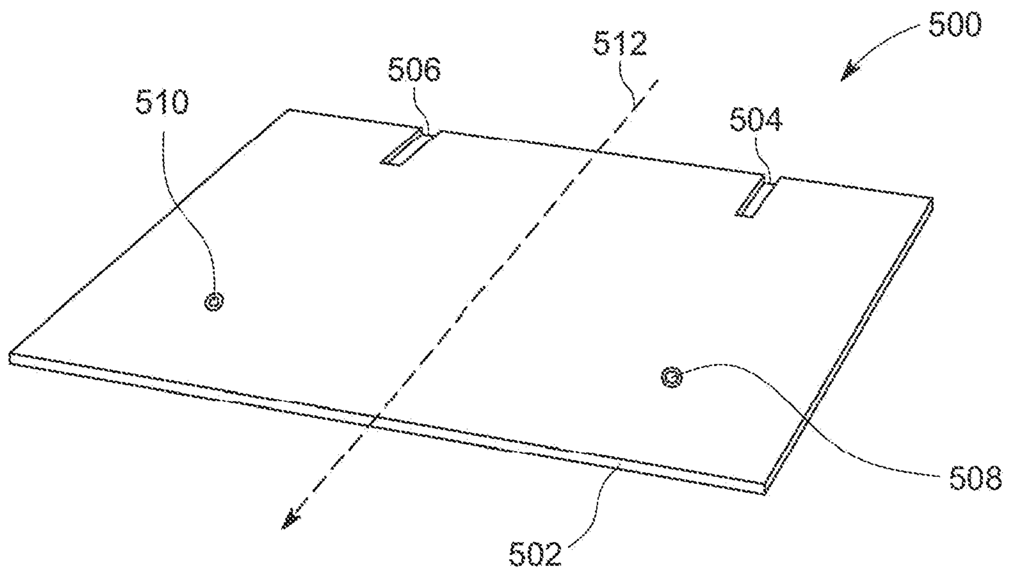
FIG. 5A shows a bottom perspective view of a cap according to a preferred embodiment. According to this embodiment, the cap has two grooves that are positioned symmetrically on each side of the axial axis of the cap platform and are cut in the bottom side of the cap platform. The grooves are in sliding and/or removable engagement with a drawer top guide, such as the one shown in FIG. 3. The cap further includes two magnets that are coupled with the cap platform along a transverse direction of the cap platform.

FIG. 5A depicts a bottom perspective view of a cap 500 according to a preferred embodiment. According to this embodiment, the cap has two grooves 504 and 506 that are positioned symmetrically on each side of an axial axis 512 of the cap platform 502 and are cut in the bottom side of the cap platform 502. The grooves 504 and 506 are in sliding and/or removable engagement with a drawer top guide, such as the drawer top guides 332 and 334 shown in FIG. 3. Specifically, the cap 500 can slide in both direction along the axial direction of the cap platform 512. The cap 500 can also be freely removed from a drawer, such as the drawer 400, i.e., lifted from or placed on the drawer top 400. The cap 500 further includes two or more magnets 508 and 510 that are coupled with the cap platform 502 along a transverse direction of the cap platform 502. The magnets 508 and 510 in the cap platform 502 operate to magnetically couple the cap 500 with the top metallic layer of a drawer top, such as the drawer top 402 of the drawer 400 shown in FIG. 4B.

Figure 5B:
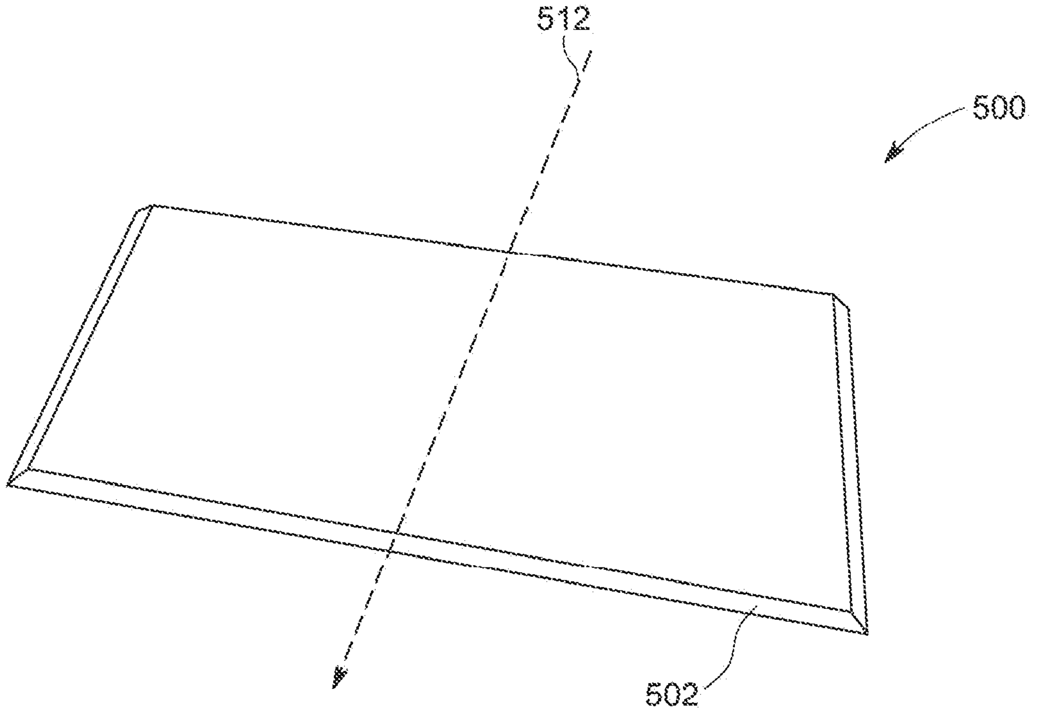
FIG. 5B shows a top perspective view of the cap of FIG. 5A. The cap platform is made from a composite material consisting of a thick layer of wood and a thin layer of metal which is glued to the top of the wood. The magnets in the cap platform operate to magnetically couple the cap with the top metallic layer of the drawer top, such as the drawer top of FIG. 4B.

FIG. 5B depicts a top perspective view of the cap 500 of FIG. 5A. The cap platform 502 can be made from a composite material including a thick layer of wood and a thin layer of metal which is glued to the top of the wood. In an alternative embodiment, the top metallic layer of the cap platform 502 is fastened to the wood layer via at least one of screws, bolts, and nails. In an alternative embodiment, the cap platform 502 can be formed from a plastic material, such as an injection molded plastic.

Figure 6:
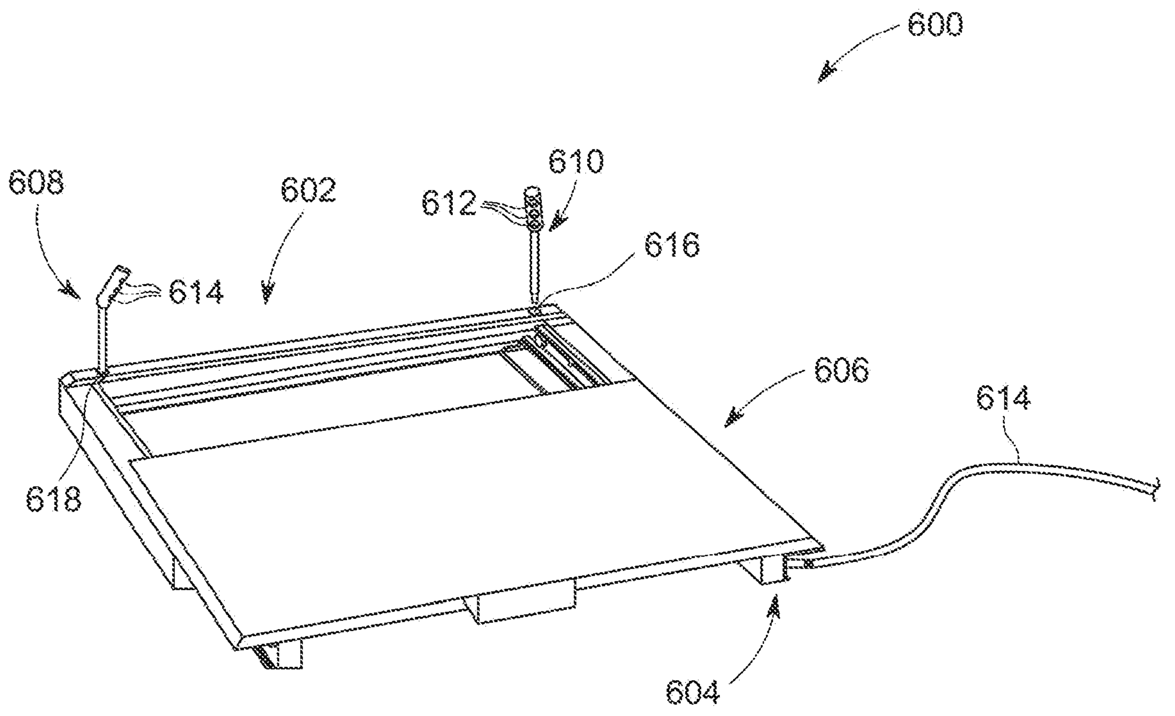
FIG. 6 shows a perspective view of a display according to a preferred embodiment. In this embodiment, the display further comprises two modular light fixtures, each having a plurality of light emitting diodes.

FIG. 6 depicts a perspective view of a display 600 according to a preferred embodiment. The display 600 comprises a riser 602, a drawer 604, and a cap 606. In this embodiment, the display 600 further comprises a lighting system comprising of two light fixtures 608 and 610. The light fixture 608 comprises a plurality of light emitting diodes (LEDs) 614 and the light fixture 610 comprises a plurality of LEDs 612. The light fixtures 608 and 610 are coupled with the riser 602 via two holes 616 and 618. In this preferred embodiment, the light fixtures 608 and 610 are modular such that upon insertion into the holes 616 and 618 they receive electrical power from the holes 616 and 618. Furthermore, the modular light fixtures 608 and 610 can easily be disconnected from the power source by pulling them out of the holes 616 and 618. The lighting system further includes a power source (not shown) that provides the electrical power to the light fixtures 608 and 610. In a preferred embodiment, the power source is located remote and provides electrical power to the light fixtures 608 and 610 via a power line 614. In some embodiments, the light fixtures 608, 610 can be connected to power line 614 that extends into the holes 616, 618. In this embodiment, the light fixtures 608, 610 may not be removable from the holes 616, 618. The power line 614, for example, can run between beam 210 and slider guide 214 (see FIG. 2) and between beam 212 and slider guide 216, along the intersection of where the riser base meets the beam (or it could actually be run through the beam itself), up to the inner front traverse wall, then up through the holes 616, 618.

Figure 7:
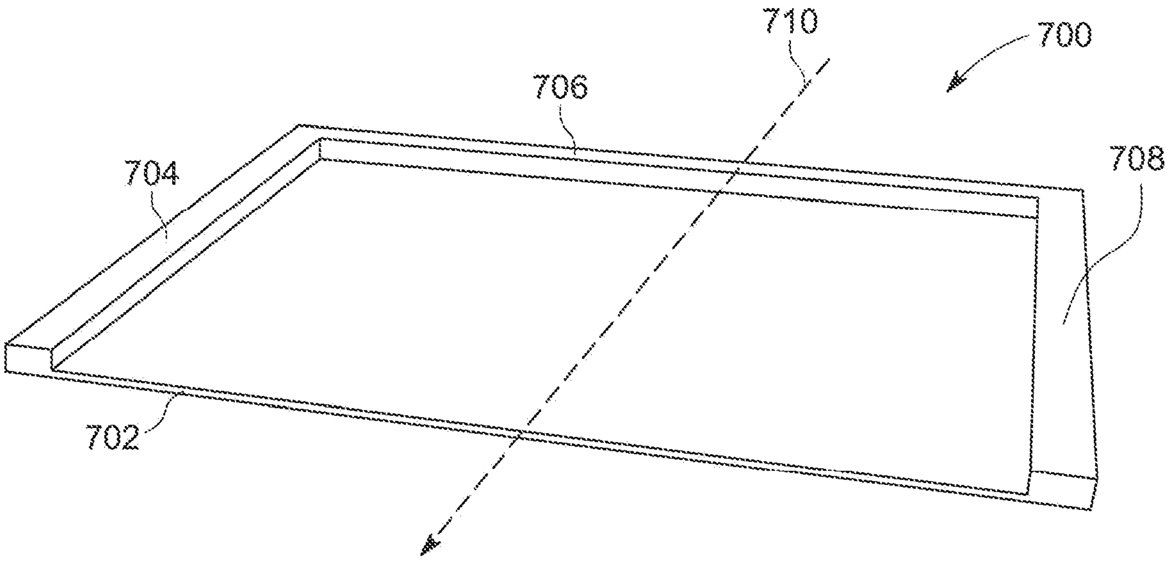
FIG. 7 shows a perspective view of a riser according to a preferred embodiment. In this embodiment, a display comprises of a riser and a cap without the use of a drawer. The riser has a riser side that is made up of three beams around a perimeter of the riser base. The cap, such as the one shown in FIGS. 8A and 8B, is in sliding/and/or removable engagement with the riser side.

FIG. 7 depicts a perspective view of a riser 700 according to a preferred embodiment. In this embodiment, a display comprises of the riser 700 and a cap, such as the cap 800 shown in FIGS. 8A and 8B, without the need for a drawer.

The riser 700 is rectangular and has a riser base 702 having a substantially planar surface. The riser 700 further includes a riser side which extends upwardly from at least a portion of the perimeter of the riser base 702. The riser side is made up of three separate beams 704, 706, and 708. All three beams have a rectangular cross section, although other cross sections such as square, circular, triangular, elliptical, etc., are contemplated. In another embodiment, the riser side is a single piece structure and is coupled with the riser base 702 along three sides of the riser base 702. The fourth side of the riser base 702 is not coupled with any structure and is left open.

In this preferred embodiment, the riser side is coupled with the riser base 702 via one or more fasteners, such as bolts, screws, and/or nails. In another embodiment, the riser side may be coupled with the riser base 702 via an adhesive. In some embodiments, riser side can be integrally formed with the riser base. For example, the riser base and the riser sides may be formed as a single piece via an injection molded plastic. The riser base 702 and its side can be made from a single material or a composite material. In some embodiments, the riser base 702 and its side, i.e., the three separate beams 704, 706, and 708 are made from wood. Furthermore, in this preferred embodiment, the lengths of the three beams 704, 706, and 708 of the riser side cover the entire three sides of the rectangular riser base 702. In another embodiment, each of the three beams 704, 706, and 708 cover only a portion of the perimeter of the riser base 702, i.e., each of the three beams 704, 706, and 708 cover only a partial length of the corresponding side of the riser base 702.

In this embodiment, the riser 702 does not require any riser guides. The cap, such as the cap 800 shown in FIGS. 8A and 8B, comprises a cap side, extending downwardly from at least a portion of a perimeter of a cap platform, such as the cap platform 802 of the cap 800, wherein the cap side is in at least one of sliding and/or removable engagement with the riser side, i.e., the three beams 704, 706, and 708. Specifically, the cap 800 can slide in both direction along an axial direction of the cap platform 814, which in this embodiment is the same direction as the axial direction 710 of the riser base 702. The cap 800 can also be freely removed from the riser 702, i.e., lifted from or placed on the riser 702.

Figure 8A:
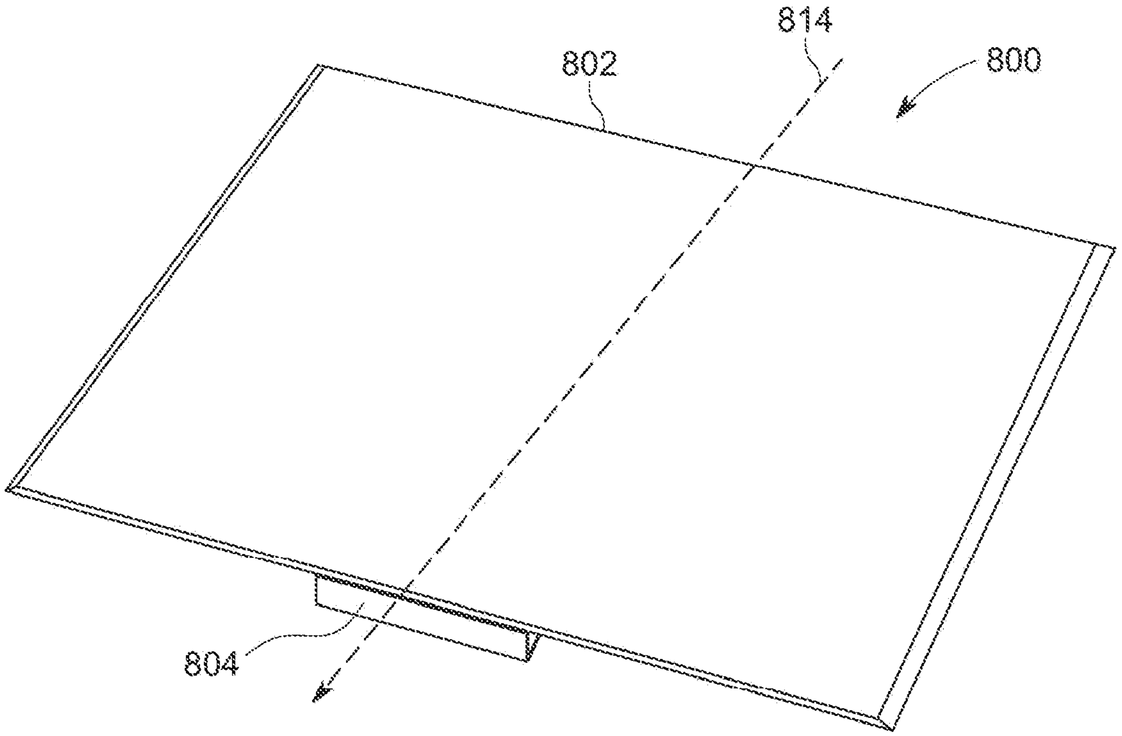
FIG. 8A shows a top perspective view of a cap according to a preferred embodiment. In this embodiment, a display comprises of a riser, such as the riser shown in FIG. 7, and this cap without the use of a drawer. The cap comprises a cap platform and a cap side which is in sliding and/or removable engagement with the riser side.

FIG. 8A depicts a top perspective view of a cap 800 according to a preferred embodiment. In this embodiment, a display comprises of a riser, such as the riser 700 shown in FIG. 7, and this cap 800 without the use of a drawer. The cap 800 comprises a cap platform 802 and a cap side, shown in FIG. 8B, which is in sliding and/or removable engagement with the riser side, such as the three beams 704, 706, and 708 of the riser side of the riser 700. The cap platform 802 is rectangular and has a substantially planar surface. The cap platform 802 can be made from a single material or a composite material. In this preferred embodiment, cap platform 802 is made from a composite material, namely a thick layer of wood on the bottom and a thin layer of sheet metal on the top. The sheet metal layer of the cap platform 802 can be used to magnetically secure items, such as jewelry holders that include magnets, to the cap platform 802. The cap 800 further includes a handle 804.

Figure 8B:
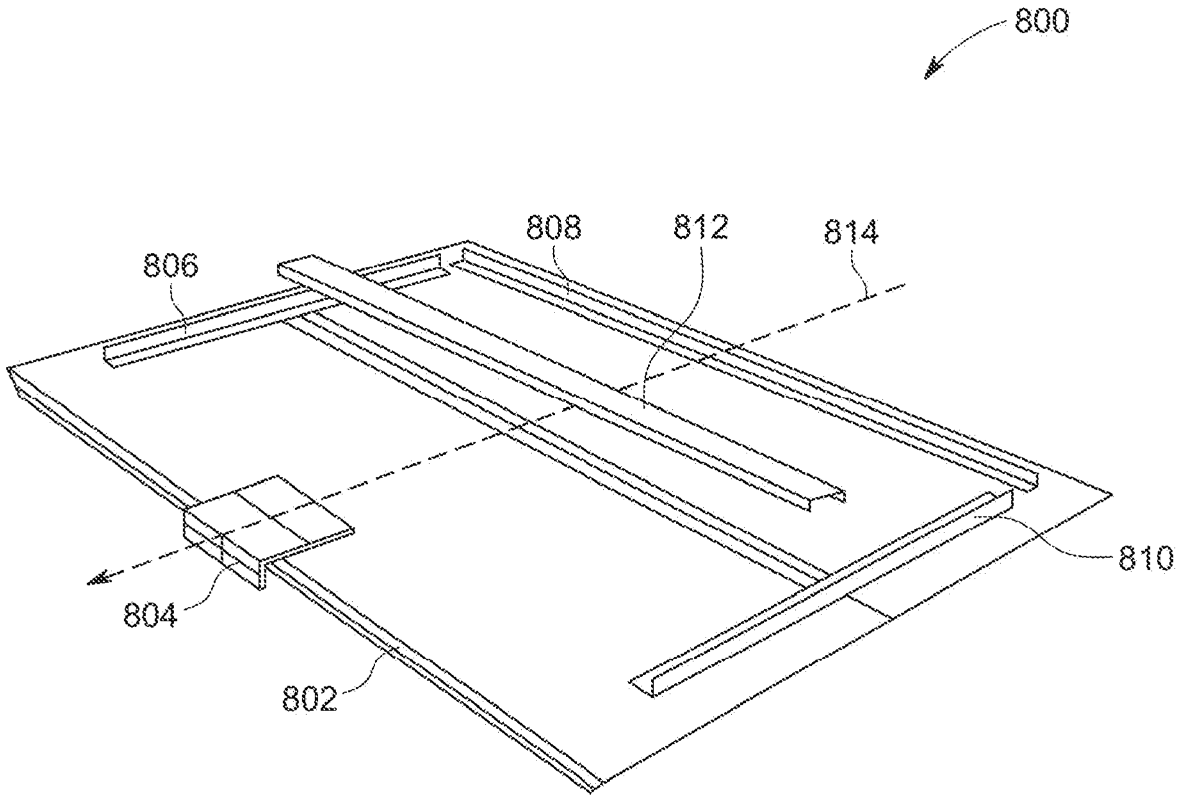

FIG. 8B shows a bottom perspective view of the cap 800 of FIG. 8A. The cap includes a cap side which comprises of three L-shaped beams (L beams, known to artisans of ordinary skill), wherein two of them, 806 and 810 are coupled with the cap platform 802 along the axial direction 814 of the cap platform 802, and the third L-shaped beam 808 is coupled with the cap platform 802 along a transverse direction of the cap platform 802. The third L-shaped beam 808 operates to prevent the cap 800 from sliding too far when it makes contact with the beam 706. The cap 800 further includes a support beam 812, similar to the support beam 416 of the drawer 400 (see FIG. 4A) along the transverse direction of the cap platform 802. The support beam 812 resists bending of the cap platform 802 around the axial direction 814. It should be understood that the support beam 812 may have various shapes, including a thin rectangular shape, a square shape, or the like.

Figure 8C:
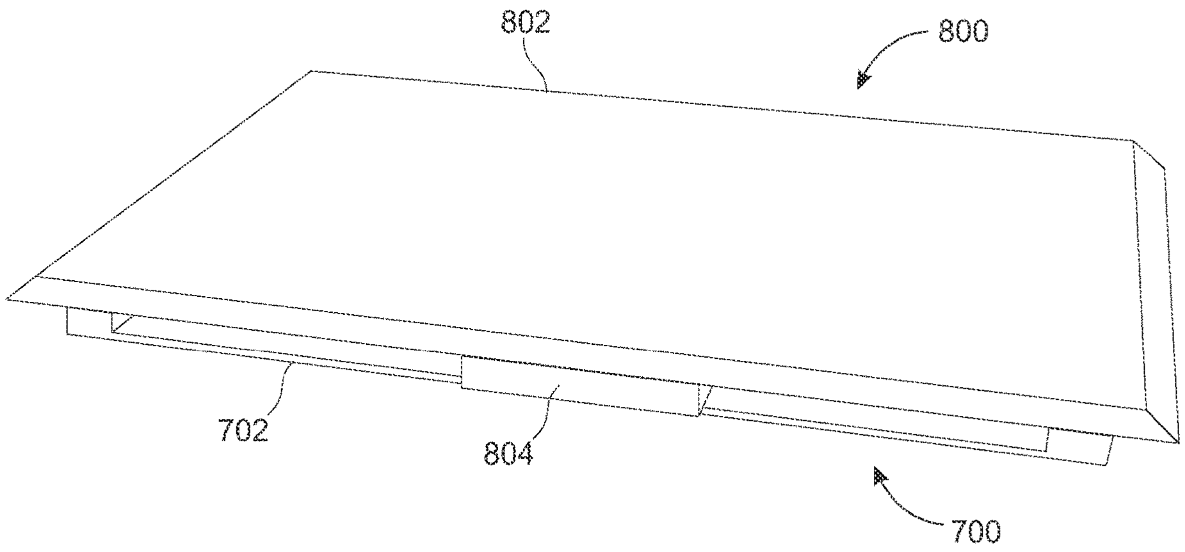
FIG. 8C shows the interaction between the riser of FIG. 7 and the cap of FIGS. 8A and 8B, where the size of the cap is larger than a riser size, and an outer perimeter edge of the riser is within the outer perimeter edge of the cap.

FIG. 8C shows the interaction between the riser 702 and the cap 800 where the size of the cap is larger than a riser size, and an outer perimeter edge of the riser is within the outer perimeter edge of the cap.

Figure 8D:
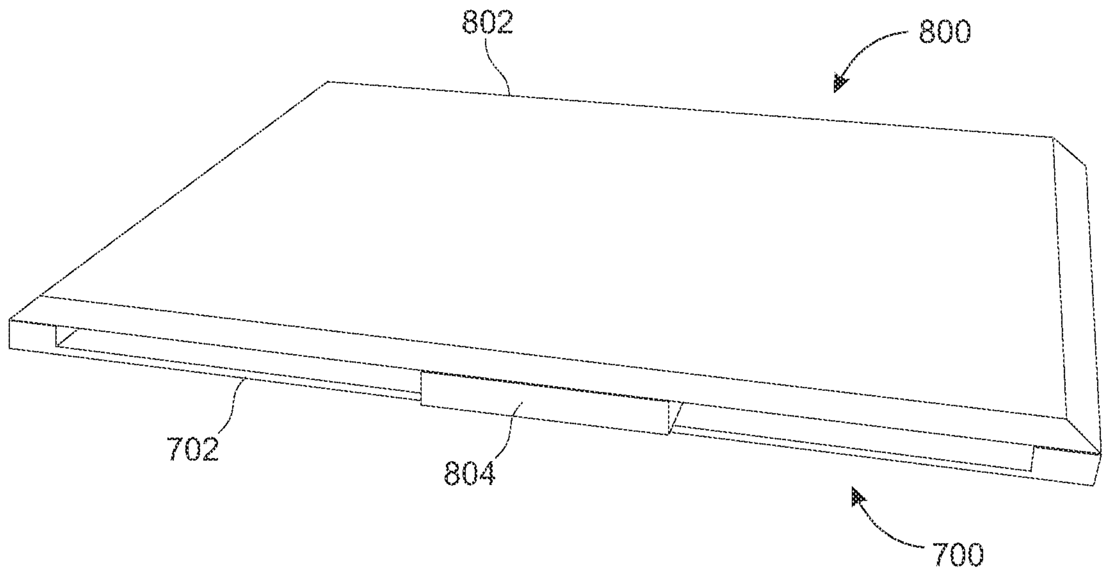
FIG. 8D shows the interaction between the riser of FIG. 7 and the cap of FIGS. 8A and 8B, where the size of the cap is the same as a riser size, and an outer perimeter edge of the riser is substantially coplanar with the outer perimeter edge of the cap.

FIG. 8D shows the interaction between the riser 702 and the cap 800 where the size of the cap 800 is the same as a riser 702 size, and an outer perimeter edge of the riser 702 is substantially coplanar with the outer perimeter edge of the cap 800.

Figure 9:
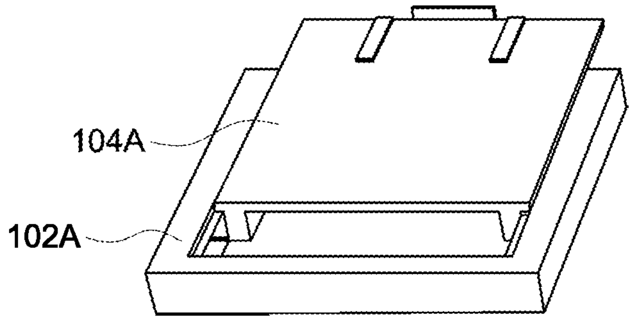
FIG. 9 is a perspective view of a display assembly, having a riser and a drawer, configured to accept caps of various sizes and shapes.
Figure 10A:
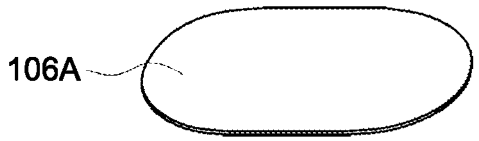
FIGS. 10A through 10D illustrate perspective views of caps of various sizes and shapes that are operable to be used with a display assembly, such as the display assembly of FIG. 9.
Figure 10B:
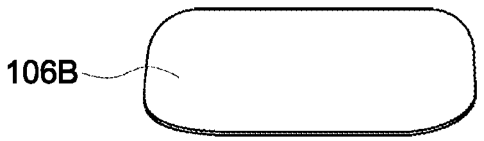
Figure 10C:
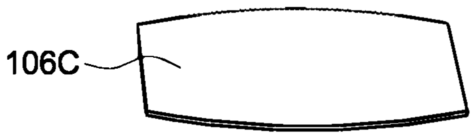
Figure 10D:
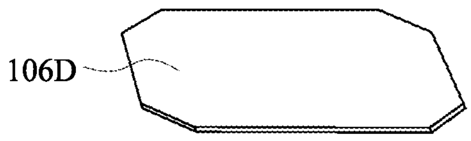
Figure 11:
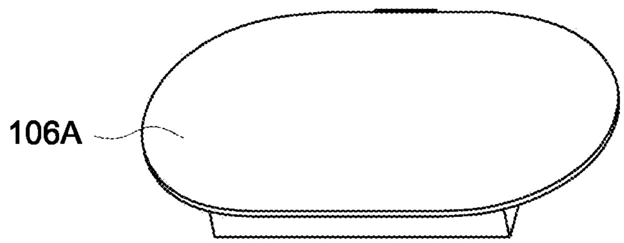
FIG. 11 illustrates a perspective view of a display assembly formed from the riser and drawer of FIG. 9 and the cap of FIG. 10A.

Referring to FIGS. 9 through 11, a riser 102A can include a drawer 104A slidably mounted there upon. The riser 102A may be attached to the drawer 104A by guides as described above, where the guides may be on the base of the riser, on the top of the side beams of the riser or on the side of the side beams of the riser, for example. The cap may be selected from various sized and shapes of cap 106A, 106B, 106C, 106D. For example, as shown in FIG. 11, the cap 106A may be an oval cap that extends beyond the edges of the riser 102A. In such an embodiment, the riser 102A and drawer 104A may be hidden from view, focusing a customer's attention on the items displayed atop the cap 106A. Of course, other sizes and shapes of the cap may be contemplated within the scope of the present invention, provided that, in the embodiment of FIGS. 9 through 11, the cap is made larger than the length and/or the width of the riser 102A. The cap 106A, for example, may connect with the top of the drawer 104A via various mechanisms, including those discussed above, such as magnets, guide strips and grooves, or the like.

Figure 12A:
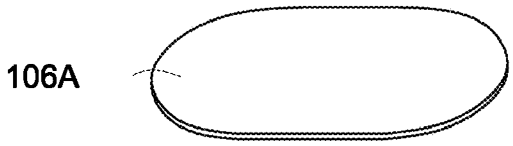
FIG. 12A illustrates a perspective view of the cap of FIG. 10A.
Figure 12B:
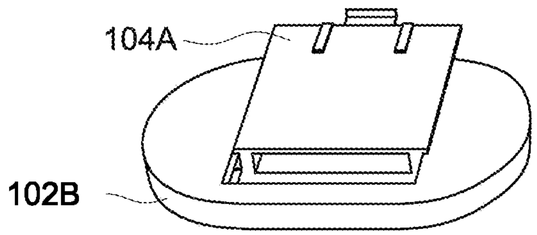
FIG. 12B illustrates a perspective view of an expanded riser and drawer assembly usable with the cap of FIG. 12A.
Figure 12C:
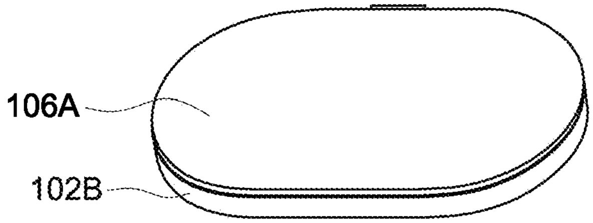
FIG. 12C illustrates a perspective view of the assembled display assembly formed from the cap of FIG. 12A and the riser and drawer of FIG. 12B, where the riser is oversized to match a size and shape of the cap.

Referring to FIGS. 12A through 12C, in some embodiments, the riser 102B may be sized to match a size and shape of the cap 106A. In this embodiment, a drawer 104A may be present, as described above. When the display is assembled, the sides of the cap 106A may be aligned with the sides of the riser 102B to provide a clean look from the cap 106A to the display case (not shown) in which the display is positioned. In some embodiments, the cap may be slightly longer and wider than the riser, such as from 0.5 to 1.5 inches, typically about 1 inch, wider on each side and on each of the front and rear of the riser. Typically, the base riser can be any size and shape that falls between the size of base riser and top cap size in FIG. 11 and the base riser and top cap size in FIG. 12C.

Figure 13A:
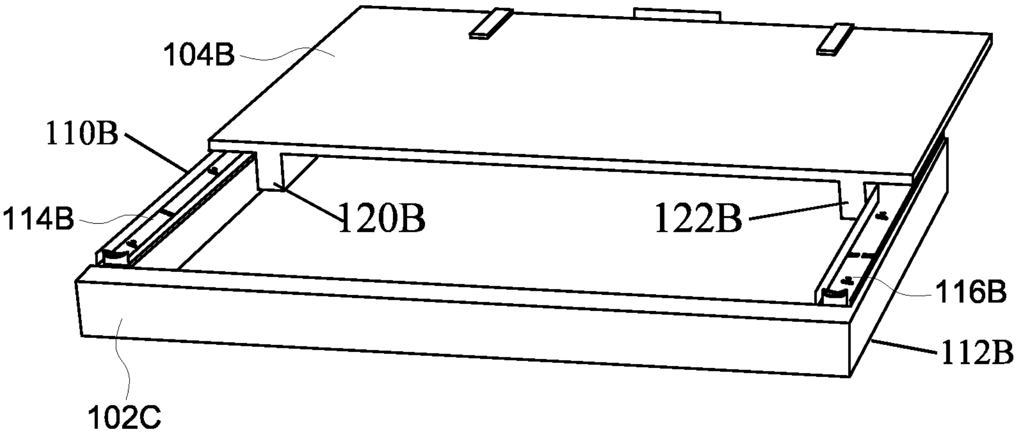
FIG. 13A illustrates a perspective view of a display assembly where the riser guides are formed on a top edge of the riser side beams.
Figure 13B:
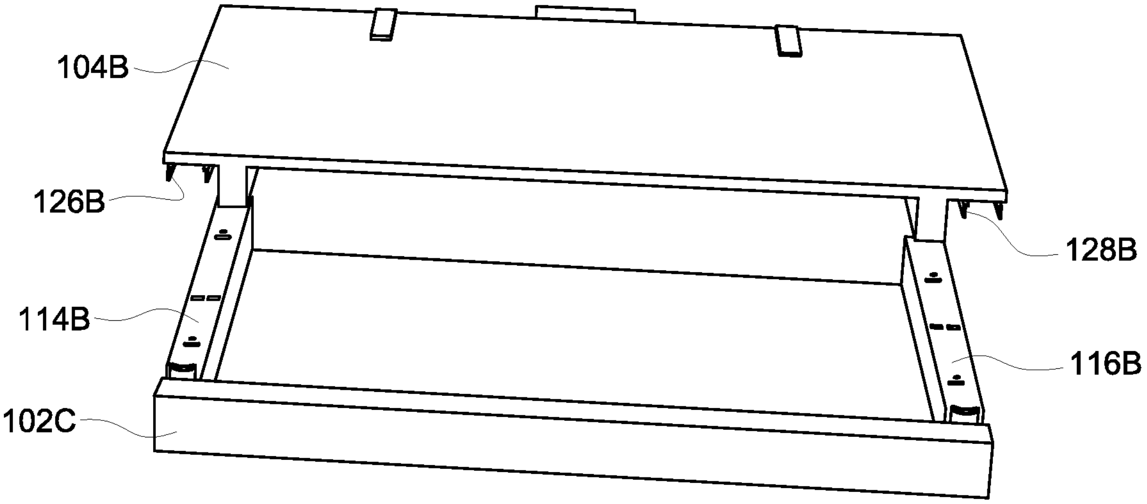
FIG. 13B illustrates an exploded perspective view of the display assembly of FIG. 13A, with the drawer separated off the riser guides.

Referring to FIGS. 13A and 13B, in some embodiments, the riser guides 114B, 116B may be positioned at a top of the side beams 110B, 112B of the riser 102C. The drawer 104B may have drawer guides 126B, 128B that are positioned on an outside of the bottom surface of the drawer 104B (outside of the drawer side beams 120B, 122B). A cap (not shown) may be placed on top of the drawer 104B, as described in detail above. In other embodiments, the drawer guides may be positioned at the bottom of the drawer side beams, thus raising the drawer 104B to a greater height. In this embodiment, to prevent visualization into the space between the drawer and the riser, a front vertical member may be disposed between the drawer side beams 120B, 122B to block such a view.

Figure 14A:
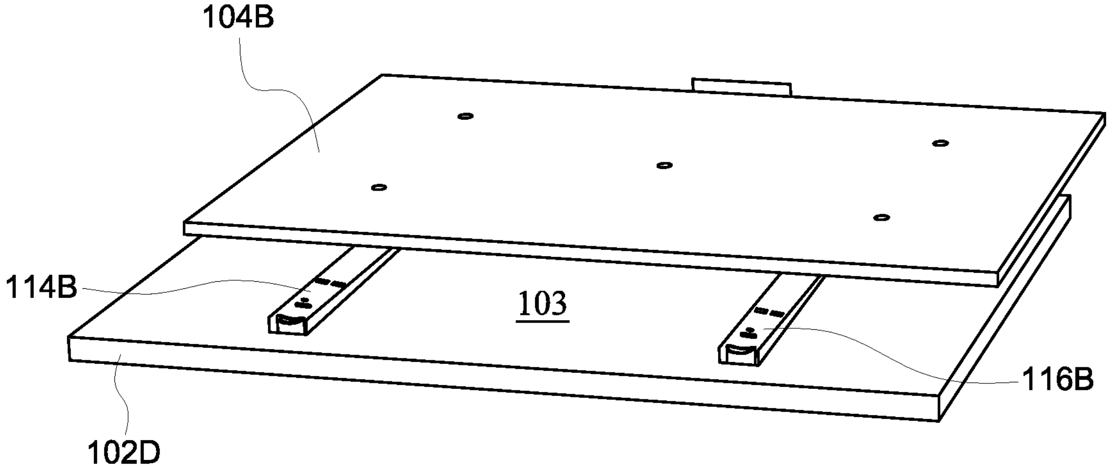
FIG. 14A illustrates a perspective view of a display assembly where the riser is formed from a flat sheet material, with the riser guides affixed thereto for sliding the drawer therealong.
Figure 14B:
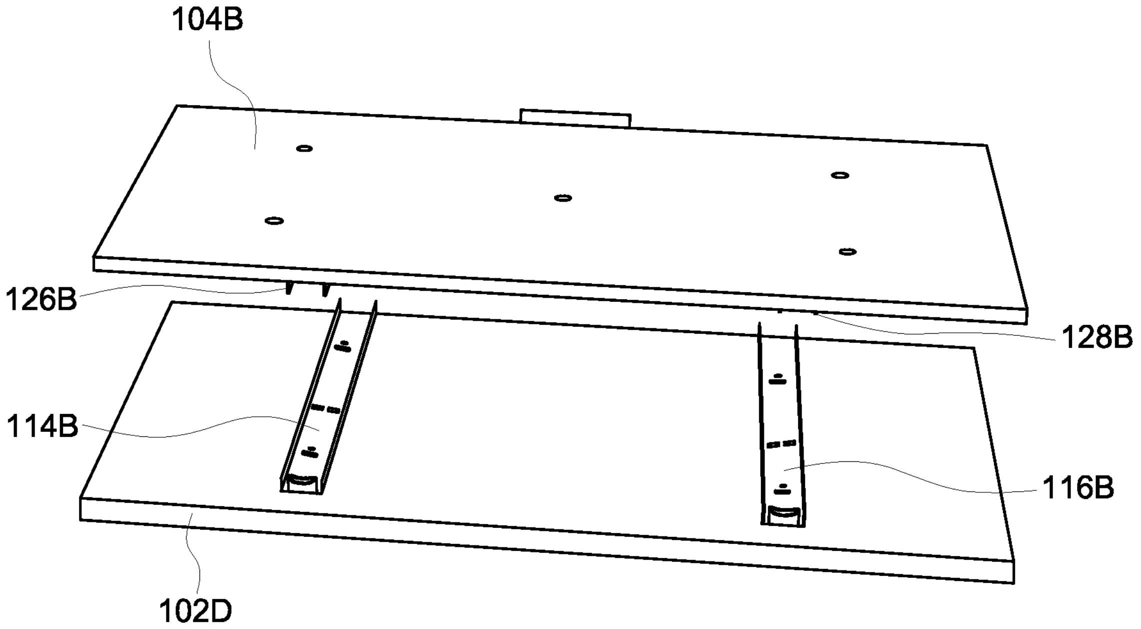
FIG. 14B illustrates an exploded perspective view of the display assembly of FIG. 14A, with the drawer separated off the riser guides.

Referring to FIGS. 14A and 14B, a riser 102D may be formed without any side beams, where the riser guides 114B, 116B can be mounded on the top surface 103 of the riser 102D. The drawer 104B may then slide along the riser guides 114B, 116B with mating drawer guides 126B, 128B. A cap (not shown) may be placed on top of the drawer 104B, as described in detail above.

Figure 15A:
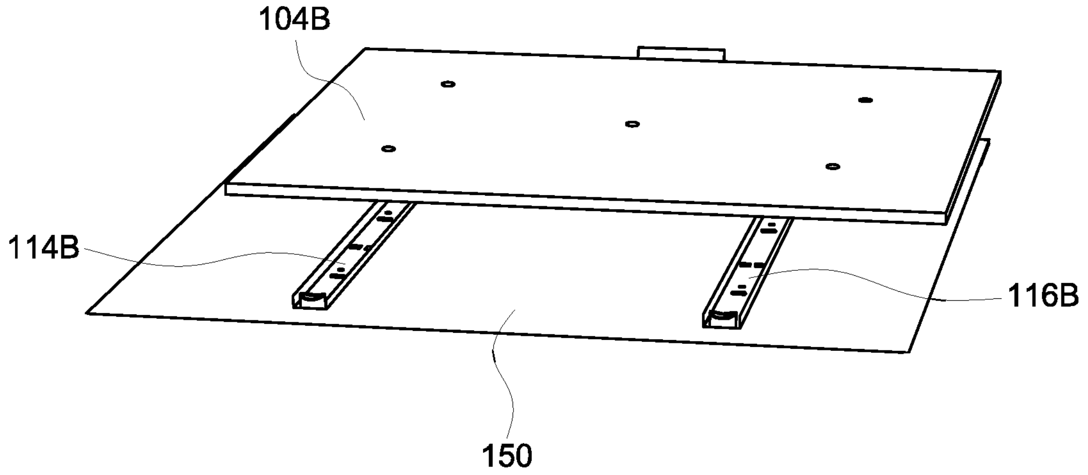
FIG. 15A illustrates a perspective view of a display assembly where the riser is omitted, allowing the riser guides to be affixed directly to a display case frame or a display case floorboard.
Figure 15B:
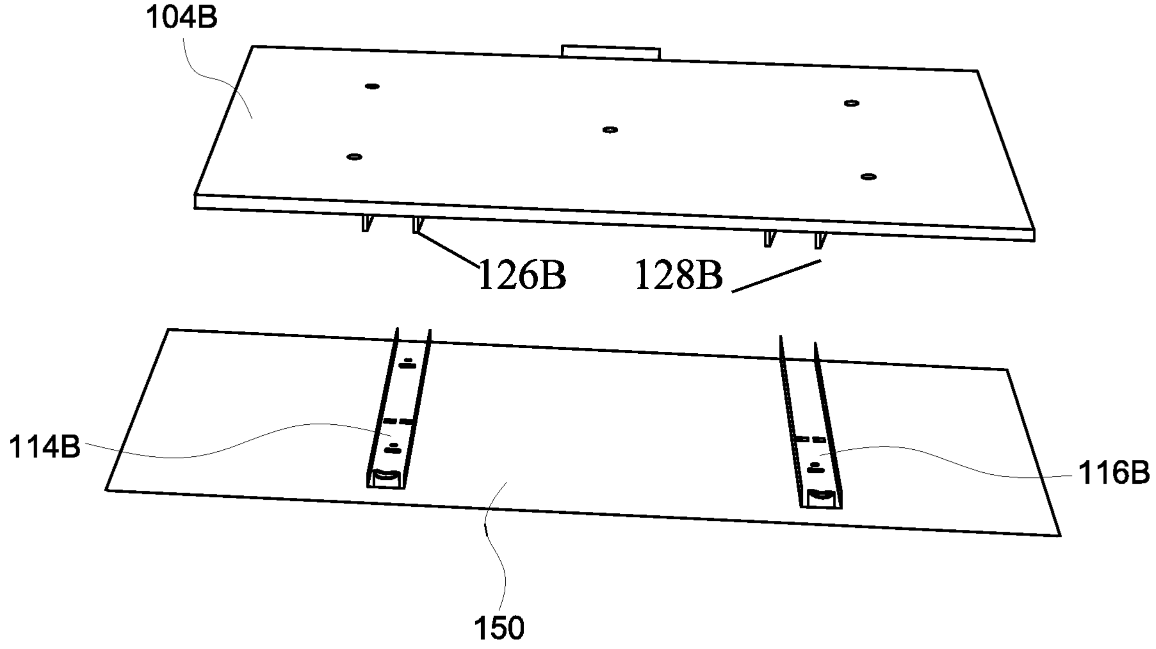
FIG. 15B illustrates an exploded perspective view of the display assembly of FIG. 15A, with the drawer separated off the riser guides.

In some embodiments, as shown in FIGS. 15A and 15B, the riser may be eliminated and the riser guides 114B, 116B may be directly mounted to a surface 150 of a display case. The surface 150 may be a floorboard of the display case or the display case frame itself, for example. The drawer 104B may then slide along the riser guides 114B, 116B with mating drawer guides 126B, 128B. A cap (not shown) may be placed on top of the drawer 104B, as described in detail above.

Figure 16A:
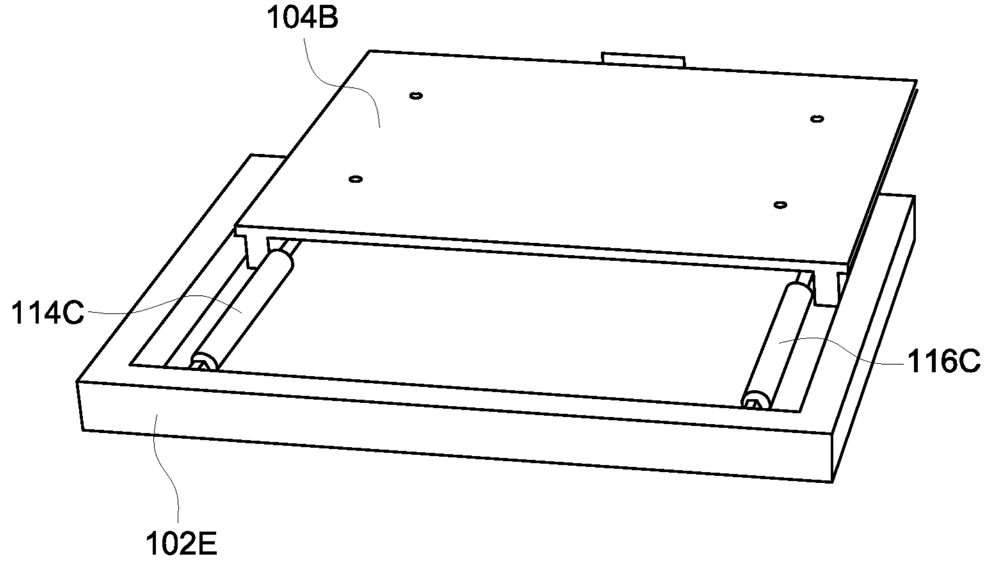
FIG. 16A illustrates a perspective view of a display assembly where the riser guides are formed as a hydraulic guide, as an example of an alternative form for the guides.
Figure 16B:
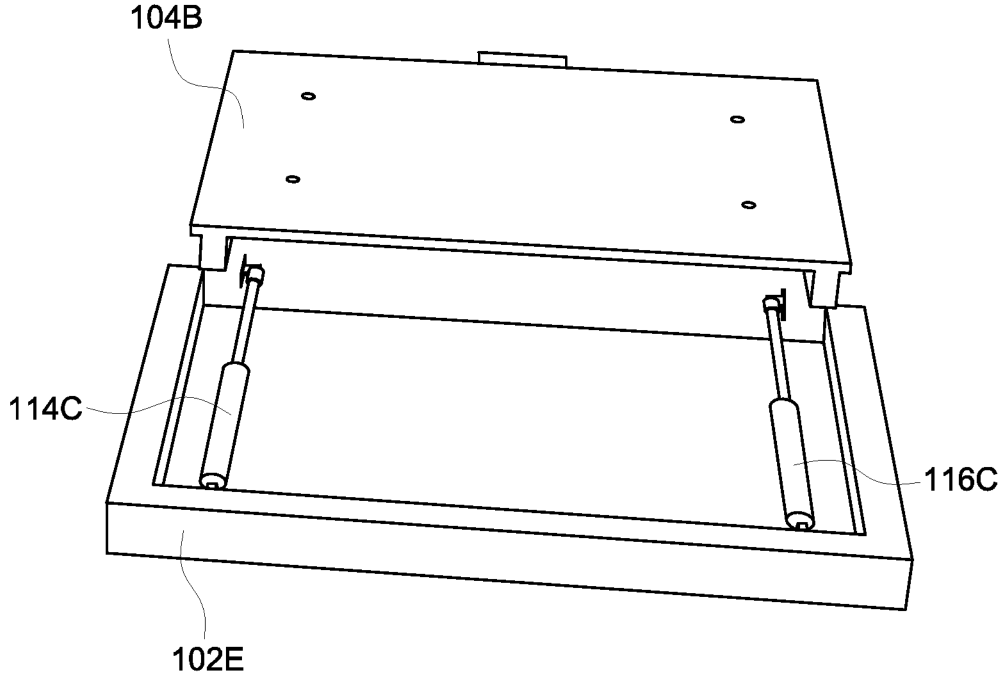
FIG. 16B illustrates an exploded perspective view of the display assembly of FIG. 16A, with the drawer separated off the riser guides.

Referring to FIGS. 16A and 16B, any of the styles described above may have the drawer guides and the riser guides replaced with another mechanism, such as a mechanically assisted attachment, to move the drawer 104B relative to the riser 102E. For example, the mechanically assisted attachment may be hydraulic cylinders 114C, 116C mounted to the riser 102E and the drawer 104B to permit relative movement (slidable engagement) therebetween. Other types of systems, such as a motorized system, a non-motorized elastic band system, a linear actuator, or any system that assists the drawer 104B to slide back into a closed position with the riser 102E, or floorboard (such as surface 150 described above with respect FIGS. 15A and 15B, above), for example.

Figure 17A:
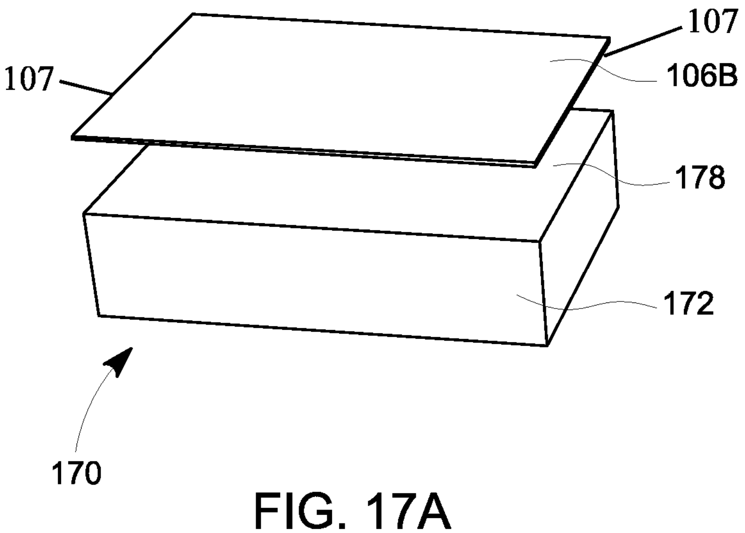
FIG. 17A illustrates a front perspective view of a riser safe display assembly.
Figure 17B:
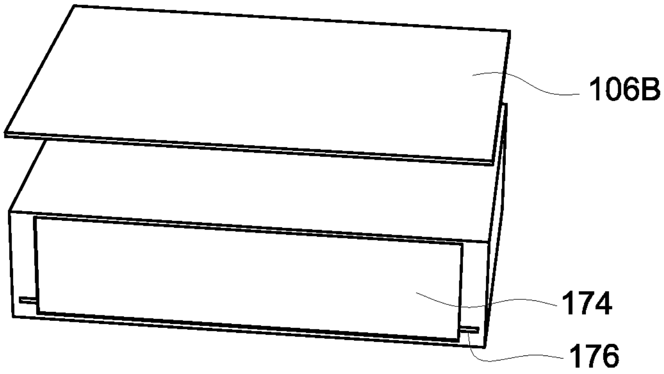
FIG. 17B illustrates a rear perspective view of the riser safe display assembly of FIG. 17A.
Figure 17C:
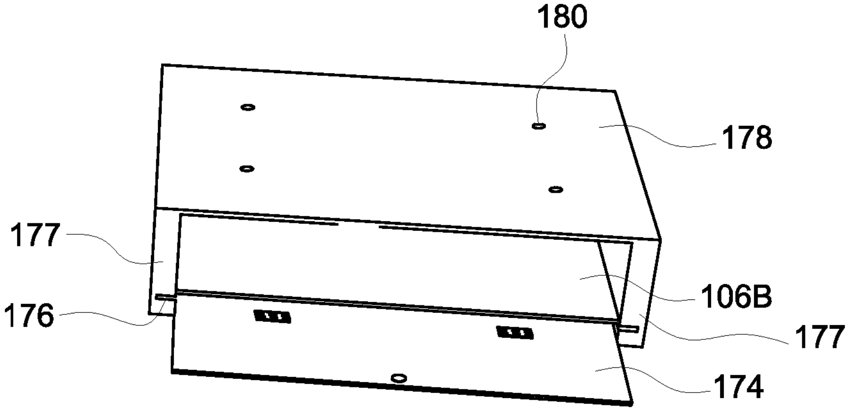
FIG. 17C illustrates a rear perspective view of the riser safe display assembly of FIG. 17A with the cap placed inside the safe for storage.

Referring to FIGS. 17A through 17C, a riser safe 170 is shown with a cap 106B mountable to a top surface 178 thereof. The riser safe 170 can form an enclosure with a solid front side 172. The back side of the riser safe 170 may include a door 174 that can open to permit access to an interior of the riser safe 170. The cap 106B may be sized to fit inside the interior of the riser safe 170 and further permit closure of the door 174 once the cap 106B is positioned inside. In some embodiments, slots 176 may be formed on opposite sides 177 of the riser safe, formed from the opening formed by the door 174, along a lower edge of the sides 177 to the front 172 of the riser safe 170. The slots can receive side edges 107 of the cap 106B as it is slid into the interior of the riser safe 170, as shown in FIG. 17C.

As best seen in FIG. 17C, magnets 180 may be formed in the top 178 of the riser safe 170 for securing the cap 106B thereto, as described in detail above. Of course, in some embodiments, the magnets may be formed in the cap 106B, wherein the top 178 of the riser safe 170 may include a magnetically attractive material. Other securing mechanisms may be used in addition to or in place of the magnets 180.

Figure 18A:
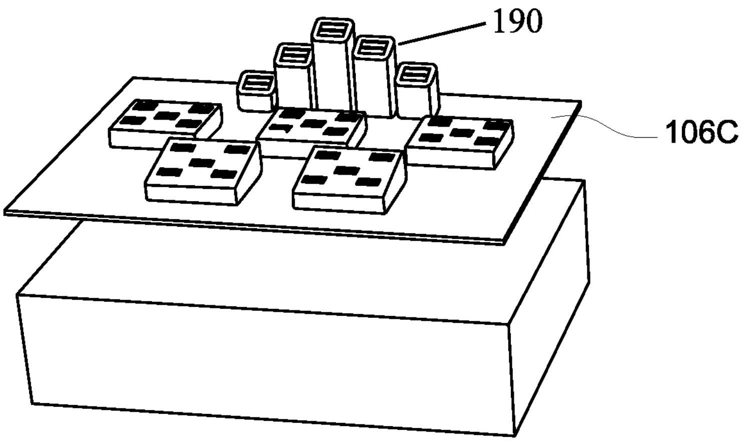
FIG. 18A illustrates a front perspective view of a riser safe display assembly without magnets or metal sheets, suitable for use of RFID tagging.
Figure 18B:
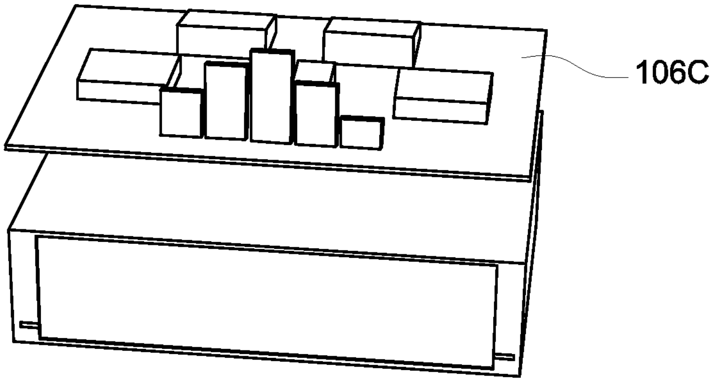
FIG. 18B illustrates a rear perspective view of the riser safe display assembly of FIG. 18A.
Figure 18C:
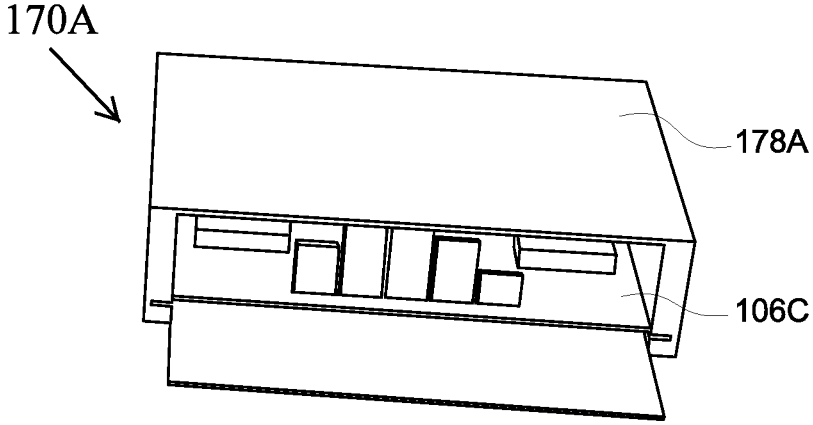
FIG. 18C illustrates a rear perspective view of the riser safe display assembly of FIG. 18A with the cap placed inside the safe for storage.

In many embodiments described above, the display system can include sheets of metal/magnets within the elements in order for the elements not to topple over during times of handling. Referring to FIGS. 18A through 18C, when products 190 include RFID tagging, where a wand reads the price tags wirelessly, for example, magnets and metal sheets can interfere with this technology. Thus, a non-magnetic display system can use no metal sheet or magnets in the top cap 106C and the elements 190. This system can have the elements sitting loosely on the top cap (or glued or screwed in place). This top cap 106C can be removed and can slide into the notched groove in the safe (as described above with respect to FIGS. 17A through 17C) or into a stores vault or safe not built into the base platform riser. The non-magnetized/metal sheet top cap 106C can be useful for those jewelers using RFID technology. The non-magnetic display system may be applied to any of the embodiments described herein, not just the specific style and design as illustrated in FIGS. 18A through 18C.

Figure 19A:
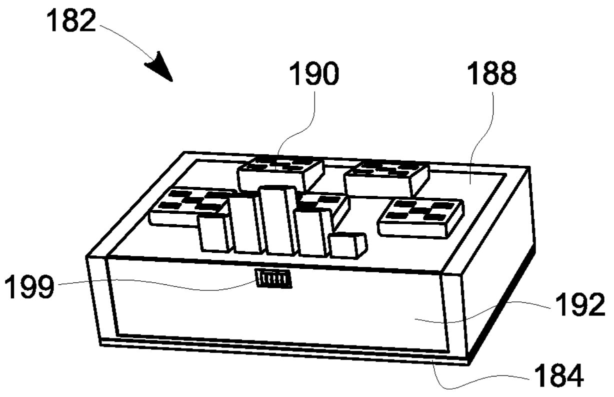
FIG. 19A illustrates a rear perspective view of a riser safe display assembly.
Figure 19B:
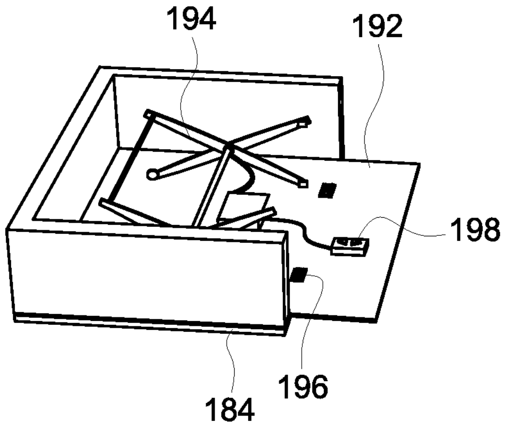
FIG. 19B illustrates a side perspective view of the riser safe display assembly with the cap removed to show a lift mechanism inside the riser.
Figure 19C:
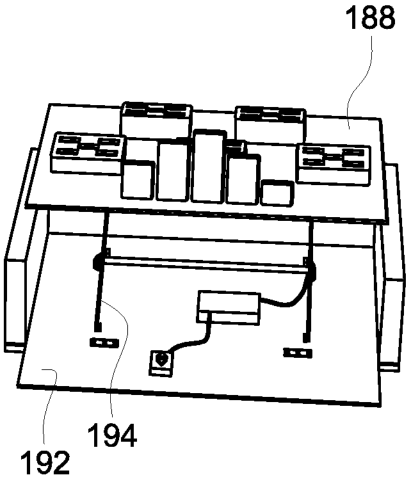
FIG. 19C illustrates a rear perspective view of the riser safe display assembly with the cap in a lifted configuration.
Figure 19D:
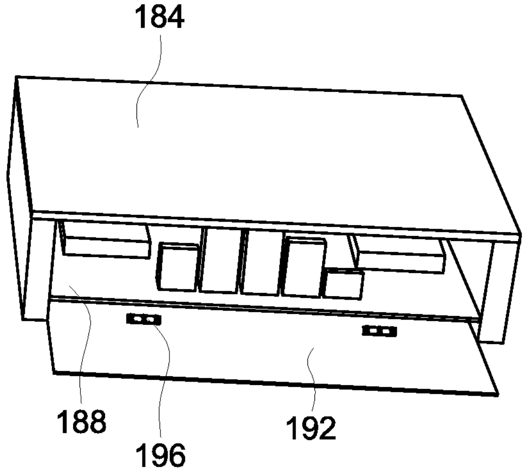
FIG. 19D illustrates a rear perspective view of the riser safe display assembly of FIG. 19A with the top cover taken from the bottom of the display assembly to cover the top of the riser safe, storing the goods inside the safe with the cap in the lowered configuration.

Referring now to FIGS. 19A through 19D, a riser safe 182 can include a cap 188 for displaying elements 190 thereon. The riser safe 182 may be closed, as shown in FIG. 19D, to provide an enclosed interior storage space therein once the door 192 is closed. In this embodiment, a lift mechanism, such as a scissor lift 194 may be used to raise and lower the cap 188 between a display position (as seen in FIG. 19A) and a storage position (as seen in FIG. 19D). A top 184 of the riser safe 182 may be stored on the bottom of the riser safe, as shown in FIG. 19A, when the system is in the display position. After the cap 188 is lowered, the top 184 may be moved from the bottom to cover the top, closing the interior of the riser safe 182. The top 184 may secure to the top of the riser safe 182 in various manners. For example, the top 184 may slide in a channel (not shown) formed in sides of the riser safe 182, where the door 192 may close, via hinges 196, to prevent sliding the top 184 out of these channels. Other mechanisms to permit the top 184 to be removably disposed between the top and bottom of the riser safe 182 are contemplated within the scope of the present invention.

A scissor lift control mechanism 198 may be disposed inside the door 192, for example, for controlling the scissor lift 194. While a scissor lift 194 is illustrated, other mechanisms may be used, such as a motorized screw drive, linear actuator, springs, or the like.

A lock 199 may be positioned on the exterior of the door 192. The lock 199 may help prevent access to an interior of the riser safe 182. While not shown, it should be understood that a lock may also be used on the riser safe 170, 170A of FIGS. 17A through 18C. The lock 199 may be a dial lock, a keyed lock, a key pad, a finger print reader lock, or the like.

In some embodiments, the door 192 of FIGS. 19A through 19D may be replaced by a solid wall. Thus, the base riser can have four sidewalls and a base. Then, the top cap can scissor down into the base and a top cap 184 is then removed from the bottom of the base riser 182 and placed on the top, as shown in FIG. 19D. The top cap 184 can lock into the four sidewalls of the base and can be removed in the morning by, for example, a key lock, digital lock, or other mechanism. This avoids having to have a door on the back. In some embodiments, the operating system for the scissor lift can be built into the back sidewall of the display to permit access without having to open a door.

The various riser safes described herein may create a graded save to store jewelry overnight, for example, thus replacing or supplementing the safe or vault present in a jewelry store.

Figure 20:
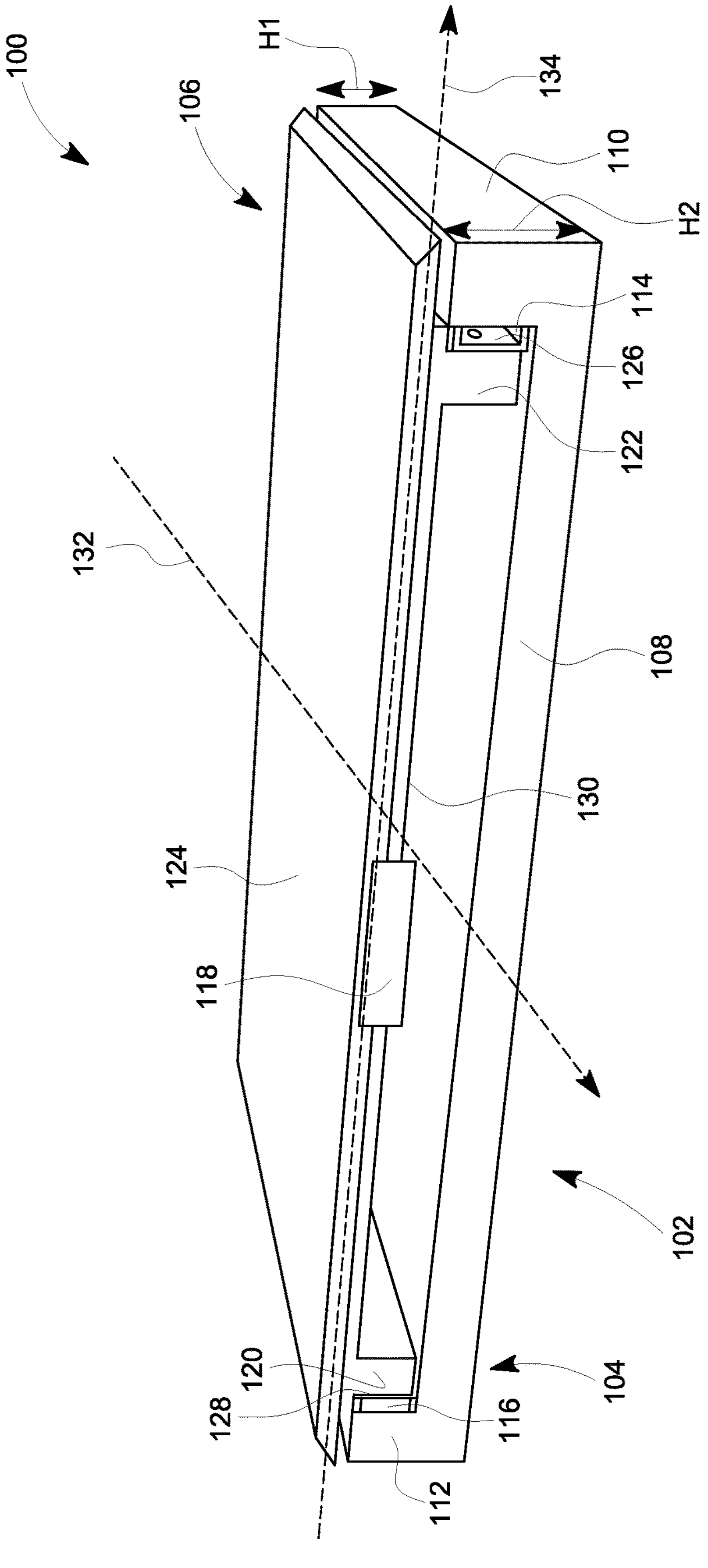
FIG. 20 illustrates a base platform riser that is slightly elevated in the back, according to an exemplary embodiment of the present invention.

Referring to FIG. 20, the display 100 of FIG. 1 is shown where the base platform riser 102 is slightly elevated in the back. By slightly elevating the back edge, many of the different methods of closing the drawer top would be assisted by gravitational pull. Visually, this would also tilt the merchandise towards the customer visually. Any and all of the above designs can be incorporated into a tilted version of the riser. As can be seen, a height H1 may be less than a height H2. Typically, the difference in height may be from about 0.5 inch to about 2 inches or more, depending on the depth of the riser 102.

Figure 21A:
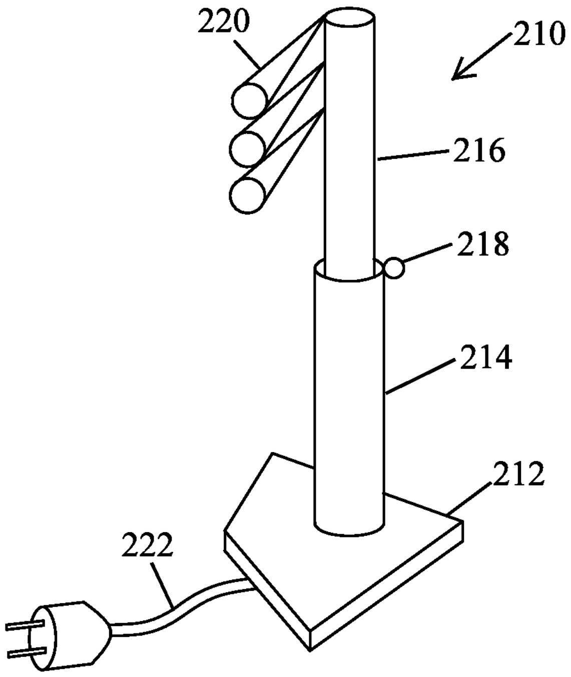
FIG. 21A illustrates a perspective view of a lighting assembly usable with the configurations of the display according to embodiments of the present invention.
Figure 21B:
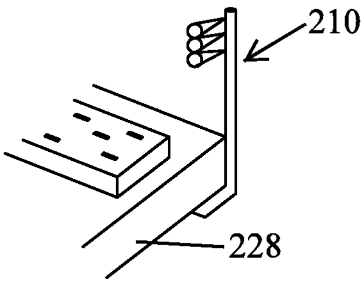
FIG. 21B illustrates a perspective view of the lighting assembly of FIG. 21A used with one of the displays.
Figure 21C:
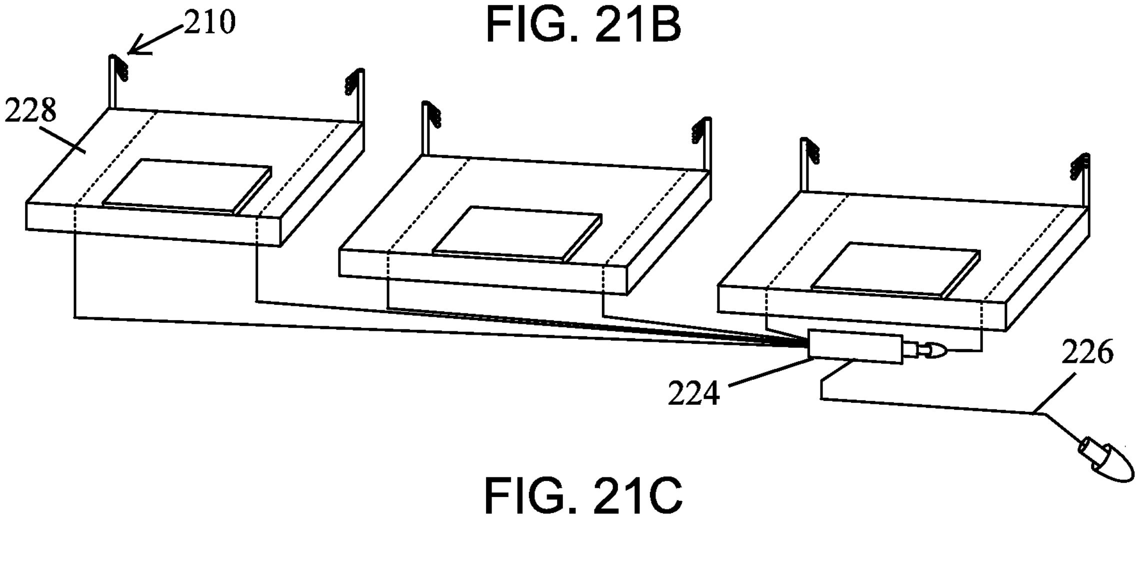
FIG. 21C illustrates a perspective view of multiple ones of the lighting assembly of FIG. 21A, chained together with a single power connection.

Referring to FIGS. 21A through 21C, a lighting assembly 210 can include a base 212 with a fixed pole 214 extending upward from the base 212. A telescoping riser 216 may telescope from the fixed pole 214 to adjust a height of one or more lighting elements 220 disposed near a top of the telescoping riser 216. A telescoping fixing member 218, such as a set screw, may be used to fix the height of the lighting assembly 210. A power cord 222 can extend from the lighting assembly 210. The lighting elements 220 may be, for example, LED lamps.

In some embodiments, multiple ones of the lighting assemblies 210 may be used on multiple displays 228, as shown in FIG. 21C. In these embodiments, the lighting assemblies 210 may have their power coupled into a combiner 224, where a single lead 226 may be used to connect to external power.

Figure 22A:
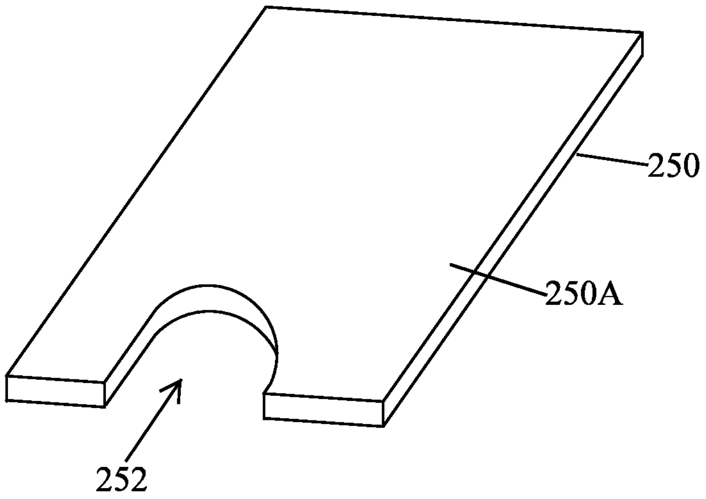
FIG. 22A illustrates a perspective view of a platform cap having a cutout for placement of a name plate therein.
Figure 22B:
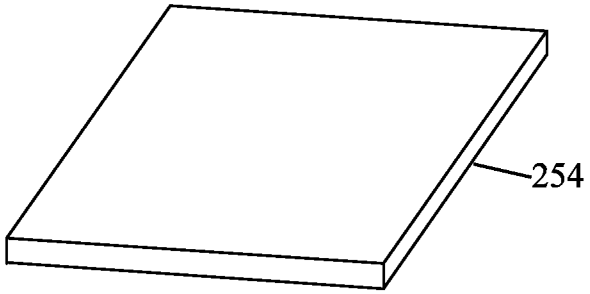
FIG. 22B illustrates a perspective view of a name plate fitting into the cutout platform cap of FIG. 22A.
Figure 22C:
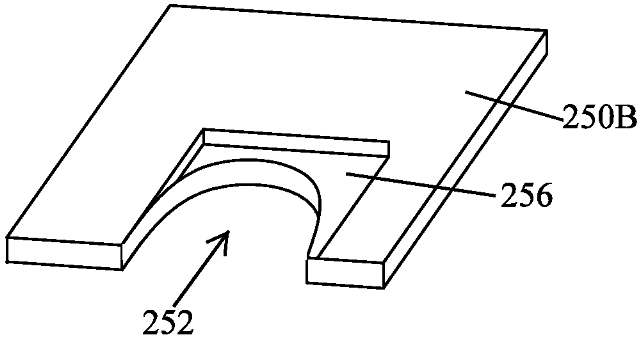
FIG. 22C illustrates a perspective view of the name plate fit into the cutout of the platform cap of FIG. 22A.

Referring now to FIGS. 22A through 22C, a cutout 252 may be formed in a platform cap 250. The platform cap 250 may be any of the previously described platform caps, for example. From a front side 250A of the platform cap 250, a half moon, half oval, or other shaped cutout may be visible. From the back side 250B of the platform cap 250, a partial depth cutout 256 may be larger than the cutout 252, permitting the placement of a nameplate 254 therein, where a portion of the nameplate 254 may be visible from the front side thereof. The nameplate 254 may include a seller's name, a type of product, or other similar indicia. With this design, an independent jeweler can now have their risers customized with a logo or message in very small quantities.

Figure 22D:
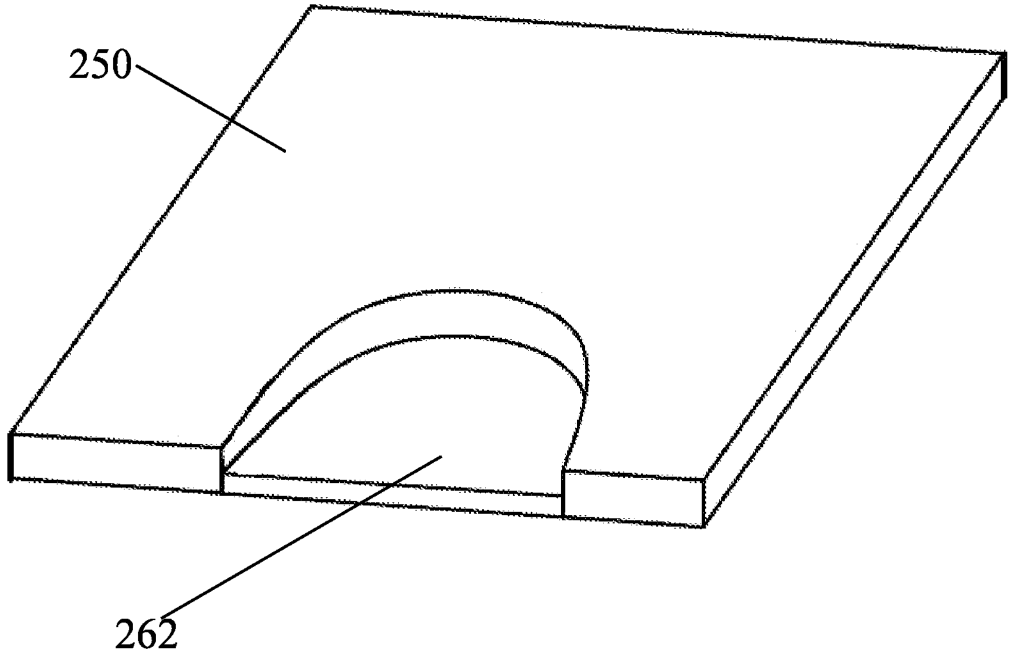
FIG. 22D illustrates a perspective view of a name plate cutout formed into a partial depth of the platform cap.

In some embodiments, as shown in FIG. 22D, a cutout 262 may be a partial depth recess formed in the platform cap 250. As in the above embodiments, the platform cap 250 may be any of the previously described platform caps, for example. In some embodiments, a piece of acrylic or other similar material may be etched or printed to show a seller's name, a type or product or other similar indicia. In some embodiments, a printed thin sheet may be placed under the acrylic for the indicia. In some embodiments, the acrylic may be some other material onto which an indicia may be placed. The cutout 262 may be of various depths, from about 2 mm to about 15 mm, for example, typically, the cutout 262 has a depth from about 10 percent to about 70 percent of the thickness of the platform cap 250. While the cutout 262 is shown in a half-moon shape, it should be understood that the cutout 260 may be any shape, such as square, rectangular, oval, triangular, or any geometric or non-geometric shape.

Of course, other shapes of the cutouts may be realized within the scope of the present invention, provided that a nameplate may be placed and retained in the cutout.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A display, comprising:

a riser having a riser base with a riser base upper surface;

a riser side extending from the riser base upper surface, wherein the riser side comprises three beams extending from three sides of a perimeter of the riser base;

a cap having a cap upper surface for displaying items and a cap lower surface removably connected with the riser; and a cap side which is in sliding engagement with the riser side;

wherein a width of the cap is greater than a width of the cap side; and the cap is configured to move relative to a fixed position of the riser.

2. The display of claim 1, wherein the cap side is configured to be removed from the riser side.

3. The display of claim 1, wherein the size of the cap is larger than a riser size, wherein an outer perimeter edge of the riser is within the outer perimeter edge of the cap.

4. The display of claim 1, wherein the size of the cap is the same as a riser size, wherein an outer perimeter edge of the riser is substantially coplanar with the outer perimeter edge of the cap.

5. The display of claim 1, further comprising one or more magnets affixed to at least one of the riser and the cap.

6. The display of claim 5, wherein the cap is formed from a material made from plastic, wood, metal, or a combination thereof.

7. A display, comprising:

a riser, comprising:

a riser base with a riser base upper surface;

opposing side walls extending upward from the riser base along opposing side edges of the riser base; and a rear wall extending upward from the riser base along a rear edge of the riser base; and a cap having a cap upper surface for displaying items and a cap lower surface removably connected with the riser, wherein the cap includes a cap platform and a cap side which is in sliding engagement with the opposing side walls of the riser; the cap platform is wider than the cap side; and the cap is configured to move relative to the riser that is stationary.

* * * * *